(12) United States Patent
Kato et al.

(10) Patent No.: US 7,301,874 B2
(45) Date of Patent: Nov. 27, 2007

(54) APPARATUS AND METHOD FOR SEARCHING FOR WRITABLE AREA, APPARATUS AND METHOD FOR UPDATING RECORDING MANAGEMENT INFORMATION, INTEGRATED CIRCUIT, AND WRITE-ONCE INFORMATION RECORDING MEDIUM

(75) Inventors: Hisae Kato, Osaka (JP); Yoshikazu Yamamoto, Osaka (JP); Hiroshi Ueda, Nara (JP); Motoshi Ito, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 703 days.

(21) Appl. No.: 10/872,930

(22) Filed: Jun. 21, 2004

(65) Prior Publication Data

US 2004/0257937 A1 Dec. 23, 2004

(30) Foreign Application Priority Data

Jun. 23, 2003 (JP) ............................. 2003-178165

(51) Int. Cl.
*G11B 11/03* (2006.01)
(52) U.S. Cl. ................ 369/53.24; 369/30.1; 369/47.14
(58) Field of Classification Search ..................... None
See application file for complete search history.

(56) References Cited

U.S. PATENT DOCUMENTS

| | | | |
|---|---|---|---|
| 5,233,591 A | 8/1993 | Nishihara | |
| 6,052,346 A | 4/2000 | Aratake et al. | |
| 6,510,114 B1 | 1/2003 | Yeo et al. | |
| 2002/0133485 A1 | 9/2002 | Furuhashi | |
| 2002/0136134 A1 | 9/2002 | Ito et al. | |
| 2004/0223440 A1* | 11/2004 | Park ........................ | 369/59.25 |
| 2005/0025003 A1* | 2/2005 | Park ........................ | 369/47.14 |

FOREIGN PATENT DOCUMENTS

| EP | 1 022 728 A1 | 7/2000 |
|---|---|---|
| WO | 00/07186 | 10/2000 |

OTHER PUBLICATIONS

International Search Report for corresponding application No. PCT/JP2004/009065 mailed Dec. 15, 2004.

* cited by examiner

*Primary Examiner*—Paul W. Huber
(74) *Attorney, Agent, or Firm*—Renner, Otto, Boisselle & Sklar, LLP

(57) ABSTRACT

An apparatus is provided for searching for a writable area of a write-once information recording medium, comprising a searching portion and a control portion. The searching portion searches for an unrecorded area using a prescribed address as a reference. The control portion provides a candidate address indicating a candidate for a writable area based on a result of the search, and performs a determination procedure for determining whether or not there is a defective area address indicating an address matching the candidate address in defect management information. When it is determined that there is not the defective area address indicating an address matching the candidate address, the control portion determines an area indicated by the candidate address as the writable area.

3 Claims, 24 Drawing Sheets

US 7,301,874 B2

APPARATUS AND METHOD FOR SEARCHING FOR WRITABLE AREA, APPARATUS AND METHOD FOR UPDATING RECORDING MANAGEMENT INFORMATION, INTEGRATED CIRCUIT, AND WRITE-ONCE INFORMATION RECORDING MEDIUM

This non-provisional application claims priority under 35 U.S.C. §119(a) on Patent Application No. 2003-178165 filed in Japan on Jun. 23, 2003, the entire contents of which are hereby incorporated by reference.

BACKGROUND OF THE INVENTION

1. Field of the Invention

The present invention relates to an apparatus and method for searching for a writable area, an apparatus and method for updating recording management information, an integrated circuit, and write-once information recording medium.

2. Description of the Related Art

Optical discs which are information recording media are sorted into several groups, depending on the recording characteristics.

An example of a write-once information recording medium, in which information can be recorded only once into the same recording area, is a write-once optical disc. Generally, write-once optical discs are highly compatible with reproduction-only discs, and are relatively inexpensive, and therefore are recently becoming widespread. Examples of write-once optical discs representatively include DVD-R, CD-R, and the like ("80 mm (1.23 Gbytes per side) and 120 mm (3.95 Gbytes per side) DVD-Recordable Disk (DVD-R)", Standard ECMA-279, December 1998). As an exemplary write-once optical disc, DVD-R will be described below.

FIG. 1 shows a DVD-R disc 100. The DVD-R disc 100 comprises an R-information area 101 and an information area 102.

The R-information area 101 comprises a PCA (Power Calibration Area) 103 and a recording management area (RMA: Recording Management Area) 104. The PCA 103 is an area for performing OPC (Optimum Power Control). The RMA 104 is an area in which information for managing the recorded state of a data area 106 is recorded.

The information area 102 comprises a lead-in area 105, the data area 106, and a lead-out area 107. The lead-in area 105 and the lead-out area 107 are control information recording areas in which a parameter required for accessing the data area 106 is recorded. In the data area 106, user data is recorded. The data area 106 is divided into recording sections called RZones. Information indicating the recorded state of each RZones 161 to 163 is recorded in the RMA 104.

In the accompanying drawings, symbol #n (n is an integer) indicates a serial number of an area or information. The serial number of information is, for example, an update counter value. In FIG. 1, symbol #n indicates the serial number of an area.

FIG. 2 is a diagram showing the RMA 104. The RMA 104 stores at least one piece of recording management information (RMD: Recording Management Data) indicating the recorded states of RZones (e.g., RMD's 191, 192, 200).

An RMD is updated, for example, when a new RZone is generated or when a disc is unloaded from a recording/reproduction apparatus. An RMD is recorded from the beginning of the RMA 104. Therefore, the latest RMD 200 is recorded at the terminating end of the recorded area of the RMA 104 (immediately before an unrecorded area 190).

In the latest RMD 200, starting addresses 211 to 213 of RZones, and last recorded addresses (LRA: Last Recorded Address) 221 to 223 which indicate the last position of the recorded areas of the RZones. When no RZone exists or no information is recorded in an RZone, the corresponding LRA indicates 0.

The latest RMD is not recorded in the RMA 104 every time the LRA is updated. Therefore, for example, when a recording/reproduction apparatus is unexpectedly powered off, the position of a read LRA may differ from the true position lastly recorded. To avoid this, by searching for the border between a recorded area and an unrecorded area, a true position lastly recorded is detected.

FIG. 3 is a flowchart showing a procedure performed by a recording/reproduction apparatus from when the DVD-R disc 100 is loaded into the recording/reproduction apparatus until when information is recorded thereonto.

In step 301, the latest RMD 200 is read out from the RMA 104.

In step 302, the RMD 200 read out in step 301 is referenced, and a writable address (NWA: Next Writable Address) corresponding to a writable RZone is sought.

FIG. 4 is a flowchart showing details of a procedure in step 301 of FIG. 3.

In step 401, the starting address of the RMA 104 is designated as a search starting address for searching for the border between a recorded area and an unrecorded area.

In step 402, the recording/reproduction apparatus determines whether or not information has been recorded at a position irradiated with laser light, in sequence, based on a reproduced signal from the disc or the like, thereby searching for the border between a recorded area ranging from the search starting address, and an unrecorded area.

It is determined whether or not the address of the unrecorded area immediately after the border between the recorded area and the unrecorded area, which has been detected in step 402, matches the starting-address of the RMA 104 (step 403). When it does not match, it is determined that an RMD has been recorded, and the process goes to step 404. When it matches, it is determined that an RMD has not been recorded, and the process goes to step 405.

An RMD located immediately before an unrecorded area is the latest RMD. Therefore, an RMD immediately before the border detected in step 402 is read out and stored into the recording/reproduction apparatus (step 404).

When the address of an unrecorded area immediately after the detected border between the recorded area and the unrecorded area matches the starting address of the RMA 104, an RMD has not been recorded in the RMA 104. In this case, for example, the disc is determined to be brand-new, and a flag indicating such a state is stored in the recording/reproduction apparatus (step 405).

FIG. 5 is a flowchart showing details of a procedure in step 302 of FIG. 3.

In step 501, the next address of an LRA of a writable RZone contained in the latest RMD read out in step 301 is designated as a search starting address.

In step 502, the border between a recorded area and an unrecorded area is sought from the search starting address.

In step 503, the address of an unrecorded area immediately after the border detected in step 502 is determined as an NWA.

According to the above-described procedure, the NWA which is a true writable address is determined. Data is recorded from the NWA as a starting position in response to a recording instruction from a higher-level control means, such as a personal computer or the like.

FIG. 6 is a flowchart showing an exemplary method for distinguishing a recorded area from an unrecorded area, which are used in procedures in steps 402 and 502.

In step 601, the amplitude of a reproduced signal read out from an optical disc is detected.

It is determined whether or not the amplitude detected in step 601 exceeds a prescribed value (step 602). When it exceeds the prescribed value, the process goes to step 603, it is determined that an area irradiated with laser light is a recorded area. When the amplitude of the reproduced signal is equal to or less than the prescribed value, the process goes to step 604, it is determined that the area irradiated with laser light is an unrecorded area.

According to the above-described procedure, the border between a recorded area and an unrecorded area is sought.

Unlike write-once optical discs, information can be overwritten in the same area in rewritable optical discs. An example of a rewritable optical disc is DVD-RAM (see "120 mm (4.7 Gbytes per side) and 80 mm (1.46 Gbytes per side) DVD Rewritable Disk (DVD-RAM)", Standard ECMA-330, December 2001).

FIG. 7 shows a DVD-RAM disc (4.7 GBytes) 700. The DVD-RAM disc 700 comprises a lead-in area 701, two spare areas 702 and 704, a data area 703, and a lead-out area 705.

In the case of DVD-RAM, an area incapable of recording/reproduction (i.e., a defective area) may occur during the production of the disc or due to scratch or stain on a surface of the disc, or the like. To prevent a reduction in system reliability due to the presence of a defective area, defect management is performed. In the defect management, when a defective area is detected in the data area 703, information which was supposed to be recorded into the defective area is recorded into the spare area 702 or 704. Defect management information (DMS: Defect Management Structure) for managing a defective area when the defective area is detected is recorded in defect management areas (DMA: Defect Management Area) 706 to 709 possessed by the lead-in area 701 and the lead-out area 705.

FIG. 8 is a diagram showing the DMA 706. The DMA 706 comprises a DDS (Disc Definition Structure) 801 and a DFL (Defect List) 802 as defect management information. The DFL 802 comprises defective area addresses 821 and 822 indicating the address of a detected defective area, and replacement destination addresses 823 and 824 in a spare area.

The same information as that in the DMA 706 is recorded in each of DMA's 707 to 709.

At present, defect management is not performed for a write-once optical disc, such as DVD-R or the like. As a semiconductor laser capable of outputting shorter-wavelength light is developed, the recording density of an optical disc is becoming higher. Therefore, a scratch or a stain on an optical disc is relatively large compared to a groove or a mark formed on the optical disc, likely leading to an increase in defective areas incapable of recording/reproduction.

As described above, an NWA is detected before recording for write-once optical discs. In this case, a recorded area is distinguished from an unrecorded area based on the amplitude value of a reproduced signal. A defective area has a low quality of reproduced signal, i.e., a reproduced signal having a small amplitude. It is likely to determine such a defective area as a writable unrecorded area.

SUMMARY OF THE INVENTION

According to an aspect of the present invention, an apparatus is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The apparatus comprises: a head portion for performing at least one of recording information onto the write-once information recording medium and reproducing information from the write-once information recording medium; a searching portion for searching for an unrecorded area of the write-once information recording medium; and a control portion for controlling operations of the head portion and the searching portion. The searching portion searches for the unrecorded area using a prescribed address as a reference. The control portion provides a candidate address indicating a candidate for the writable area based on a result of the search, and performs a determination procedure for determining whether or not there is a defective area address indicating an address matching the candidate address in the defect management information. When it is determined that there is the defective area address indicating an address matching the candidate address, the searching portion performs a second search for another unrecorded area using an address after the candidate address as a reference, and the control portion resets the candidate address based on a result of the second search and performs the determination procedure. When there is not the defective area address indicating an address matching the candidate address, the control portion determines an area indicated by the candidate address as the writable area.

According to another aspect of the present invention, an apparatus is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The apparatus comprises: a head portion for performing at least one of recording information onto the write-once information recording medium and reproducing information from the write-once information recording medium; a searching portion for searching for an unrecorded area of the write-once information recording medium; and a control portion for controlling operations of the head portion and the searching portion. When there is at least one defective area in a prescribed recording range of the data area, the control portion detects a defective area address indicating an address of a defective area located at a last address in the at least one defective area of the prescribed recording range. The control portion sets an address, located after both the detected defective area address and a recorded area address indicating a recorded area of the prescribed recording range, to be a candidate address indicating a candidate for the writable area. The searching portion searches for an unrecorded area using the candidate address as a reference, and the control portion determines the detected unrecorded area as the writable area.

According to another aspect of the present invention, an apparatus is provided for updating recording management information indicating a recorded state of a data area for recording user data of a write-once information recording medium. The write-once information recording medium further comprises a recording management area for recording the recording management information. The recording management information contains at least one recorded area address indicating at least one recorded area. The apparatus comprises: a head portion for performing at least one of recording information onto the write-once information recording medium and reproducing information from the write-once information recording medium; a searching portion for searching for an unrecorded area of the write-once information recording medium; and a control portion for controlling operations of the head portion and the searching portion. The control portion determines whether or not there is a defective area in a prescribed recording range of the data area. When there is the defective area in the prescribed recording range, the control portion updates the recording management information so that a recorded area address indicating the terminating end of a recorded area in the prescribed recording range indicates an address on or after an address indicating the defective area.

In one embodiment of this invention the write-once information recording medium further comprises a defect management area for recording defect management information for managing the defective area when there is the defective area. When there is the defective area in the prescribed recording range, the control portion updates the defect management information so that the defect management information contains a defective area address indicating the defective area.

According to another aspect of the present invention, an integrated circuit is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The integrated circuit comprises: a searching portion for searching for an unrecorded area of the write-once information recording medium; and a control portion for controlling an operation of the searching portion. The searching portion searches for the unrecorded area using a prescribed address as a reference. The control portion provides a candidate address indicating a candidate for the writable area based on a result of the search, and performs a determination procedure for determining whether or not there is a defective area address indicating an address matching the candidate address in the defect management information. When it is determined that there is the defective area address indicating an address matching the candidate address, the searching portion performs a second search for another unrecorded area using an address after the candidate address as a reference, and the control portion resets the candidate address based on a result of the second search and performs the determination procedure. When there is not the defective area address indicating an address matching the candidate address, the control portion determines an area indicated by the candidate address as the writable area.

According to another aspect of the present invention, an integrated circuit is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The integrated circuit comprises: a searching portion for searching for an unrecorded area of the write-once information recording medium; and a control portion for controlling an operation of the searching portion. When there is at least one defective area in a prescribed recording range of the data area, the control portion detects a defective area address indicating an address of a defective area located at a last address in the at least one defective area of the prescribed recording range. The control portion sets an address, located after both the detected defective area address and a recorded area address indicating a recorded area of the prescribed recording range, to be a candidate address indicating a candidate for the writable area. The searching portion searches for an unrecorded area using the candidate address as a reference, and the control portion determines the detected unrecorded area as the writable area.

According to another aspect of the present invention, an integrated circuit is provided for updating recording management information indicating a recorded state of a data area for recording user data of a write-once information recording medium. The write-once information recording medium further comprises a recording management area for recording the recording management information. The recording management information contains at least one recorded area address indicating at least one recorded area. The integrated circuit comprises: a searching portion for searching for an unrecorded area of the write-once information recording medium; and a control portion for controlling an operation of the searching portion. The control portion determines whether or not there is a defective area in a prescribed recording range of the data area. When there is the defective area in the prescribed recording range, the control portion updates the recording management information so that a recorded area address indicating the terminating end of a recorded area in the prescribed recording range indicates an address on or after an address indicating the defective area.

In one embodiment of this invention, the write-once information recording medium further comprises a defect management area for recording defect management information for managing the defective area when there is the defective area. When there is the defective area in the prescribed recording range, the control portion updates the defect management information so that the defect management information contains a defective area address indicating the defective area.

According to another aspect of the present invention, a method is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The method comprises the steps of: searching for the unrecorded area using a prescribed address as a reference; providing a candidate address indicating a candidate for the writable area based on a result of the search, and performing a determination procedure for determining whether or not there is a defective area address indicating an address matching the candidate address in the defect management information; when it is determined that there is the defective area address indicating an address matching the candidate address, performing a second search for another unrecorded area using an address after the candidate address as a reference, and resetting the candidate address based on a result of the second search and performs the determination procedure; and when there is not the defective area address indicating an address matching the candidate address, determining an area indicated by the candidate address as the writable area.

According to another aspect of the present invention, a method is provided for searching for a writable area of a write-once information recording medium. The write-once information recording medium comprises: a data area for recording user data; a recording management area for recording recording management information indicating a recorded state of the data area; and a defect management area for recording defect management information for managing at least one defective area when the at least one defective area has been detected in the data area. The recording management information contains at least one recorded area address indicating at least one recorded area. The defect management information contains at least one defective area address indicating the at least one defective area when the at least one defective area has been detected. The method comprises the steps of: when there is at least one defective area in a prescribed recording range of the data area, detecting a defective area address indicating an address of a defective area located at a last address in the at least one defective area of the prescribed recording range; setting an address, located after both the detected defective area address and a recorded area address indicating a recorded area of the prescribed recording range, to be a candidate address indicating a candidate for the writable area; and searching for an unrecorded area using the candidate address as a reference, and determining the detected unrecorded area as the writable area.

According to another aspect of the present invention, a method is provided for updating recording management information indicating a recorded state of a data area for recording user data of a write-once information recording medium. The write-once information recording medium further comprises a recording management area for recording the recording management information. The recording management information contains at least one recorded area address indicating at least one recorded area. The method comprises the steps of: determining whether or not there is a defective area in a prescribed recording range of the data area; and when there is the defective area in the prescribed recording range, updating the recording management information so that a recorded area address indicating the terminating end of a recorded area in the prescribed recording range indicates an address on or after an address indicating the defective area.

In one embodiment of this invention, the write-once information recording medium further comprises a defect management area for recording defect management information for managing the defective area when there is the defective area. The method further comprises the step of: when there is the defective area in the prescribed recording range, updating the defect management information so that the defect management information contains a defective area address indicating the defective area.

According to another aspect of the present invention, a write-once information recording medium is provided, comprising: a data area for recording user data; and a recording management area for recording recording management information indicating a recorded state of the data area. The recording management information contains at least one recorded area address indicating at least one recorded area. Where there is a defective area in a prescribed recording range of the data area, a recorded area address indicating the terminating end of a recorded area in the prescribed recording range indicates an address on or after the defective area.

In one embodiment of this invention, the write-once information recording medium further comprises a defect management area for recording defect management information for managing the defective area when there is the defective area.

According to the present invention, it is determined whether or not a detected unrecorded area matches a defective area, thereby preventing a defective area from being determined to be a writable area. Therefore, information can be consistently recorded into a normal recording area.

According to the present invention, a write-once information recording medium is realized such that there is no detected defective area in a recorded area after a last recorded address in a prescribed recording range. According to the present invention, the latest last recorded address is consistently an address indicating a recorded area on or after a defective area. Thereby, only a one-time procedure for searching the border between a recorded area and an unrecorded area is required, resulting in a reduction in the time spent determining a writable area.

According to the present invention, a pointer indicating a starting position of information indicating a defect list or a recorded state is contained in a write-once information recording medium. Therefore, an RMD or a DMS can have a variable length. Therefore, an area can be more efficiently used.

According to the present invention, an RMD and a DMS are recorded together. Therefore, only a one-time procedure for searching the border between a recorded area and an unrecorded area is required when the latest RMD and DMS are read out, resulting in a reduction in the procedure time.

Thus, the invention described herein makes possible the advantages of providing an apparatus, integrated circuit, and method for searching for a writable area on a write-once information recording medium; an apparatus, integrated circuit, and method for updating recording management information; and a write-once information recording medium in which information is recorded using the apparatus, integrated circuit, or method of the present invention.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. Like references indicate like parts or steps in FIGS. 1 to 25, and further description is omitted in the interest of brevity.

Embodiment 1

Figure 9:
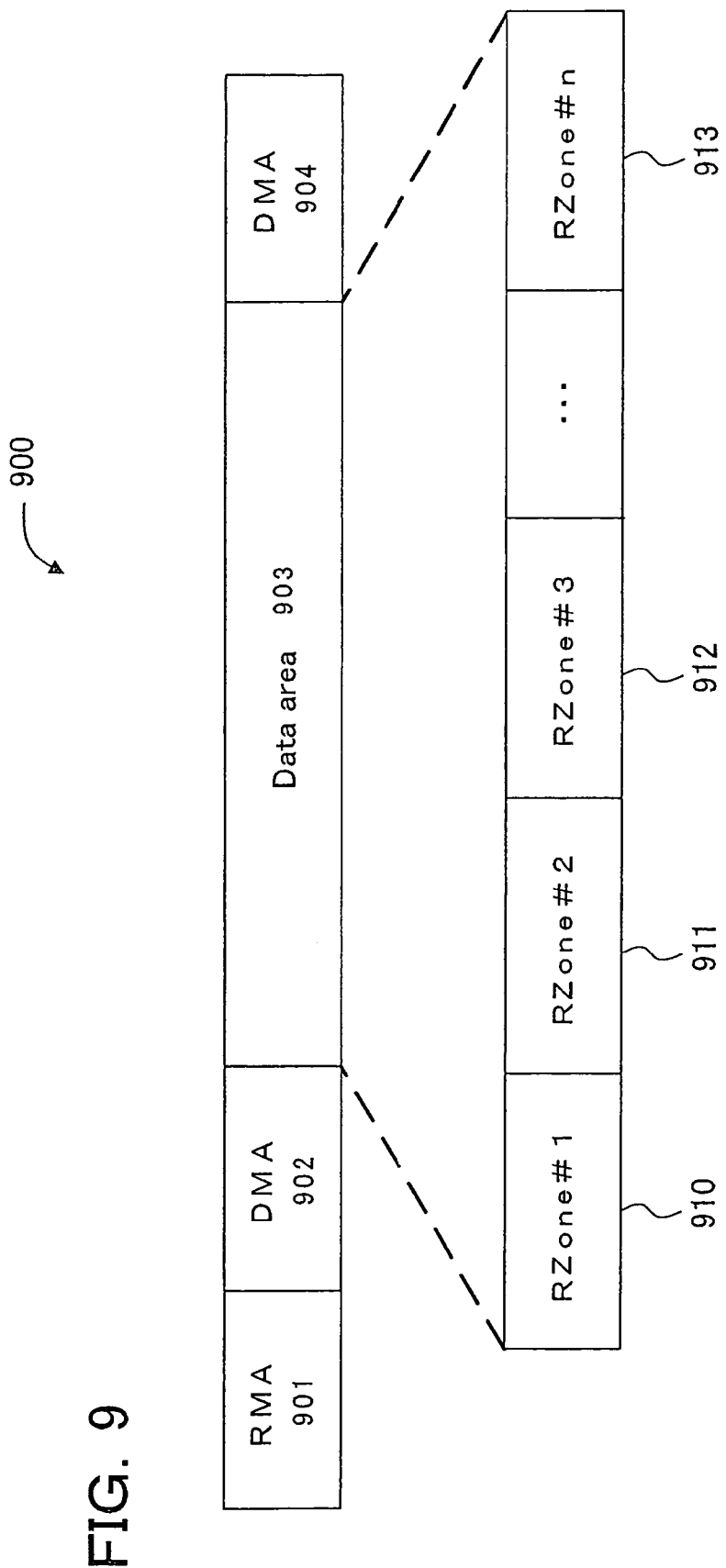
FIG. 9 is a diagram showing a write-once information recording medium according to the present invention.

FIG. 9 is a diagram showing a write-once information recording medium 900 according to Embodiment 1 of the present invention. A write-once information recording medium may also be called a write-once-read-many information recording medium.

The write-once information recording medium 900 comprises a data area 903 for recording user data, a recording management area (RMA) 901 for recording recording management information (RMD) indicating the recorded state of data area 903, and defect management areas (DMA) 902 and 904 for recording defect management information (DMS) for managing at least one defective area if it is detected in the data area 903. An RMD contains at least one recorded area address (LRA) indicating at least one recorded area. Defect management information contains at least one defective area address indicating at least one defective area if it is detected.

Figure 1:
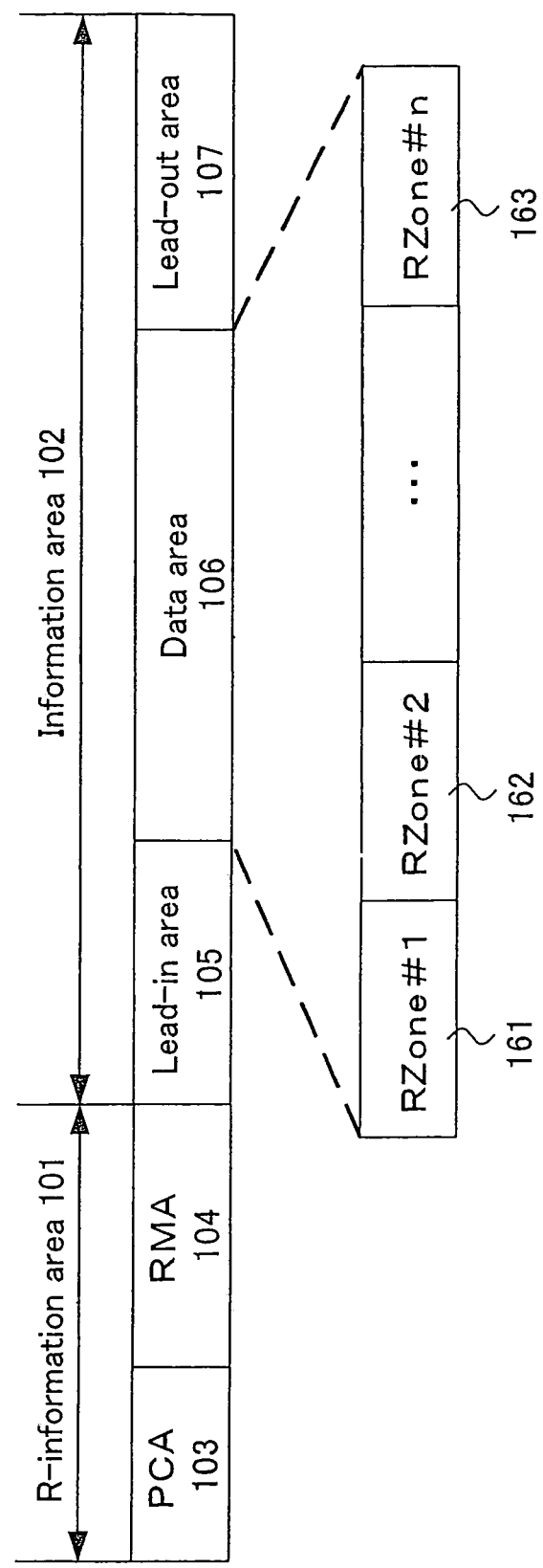
FIG. 1 is a diagram showing a data structure of a DVD-R disc.
Figure 2:
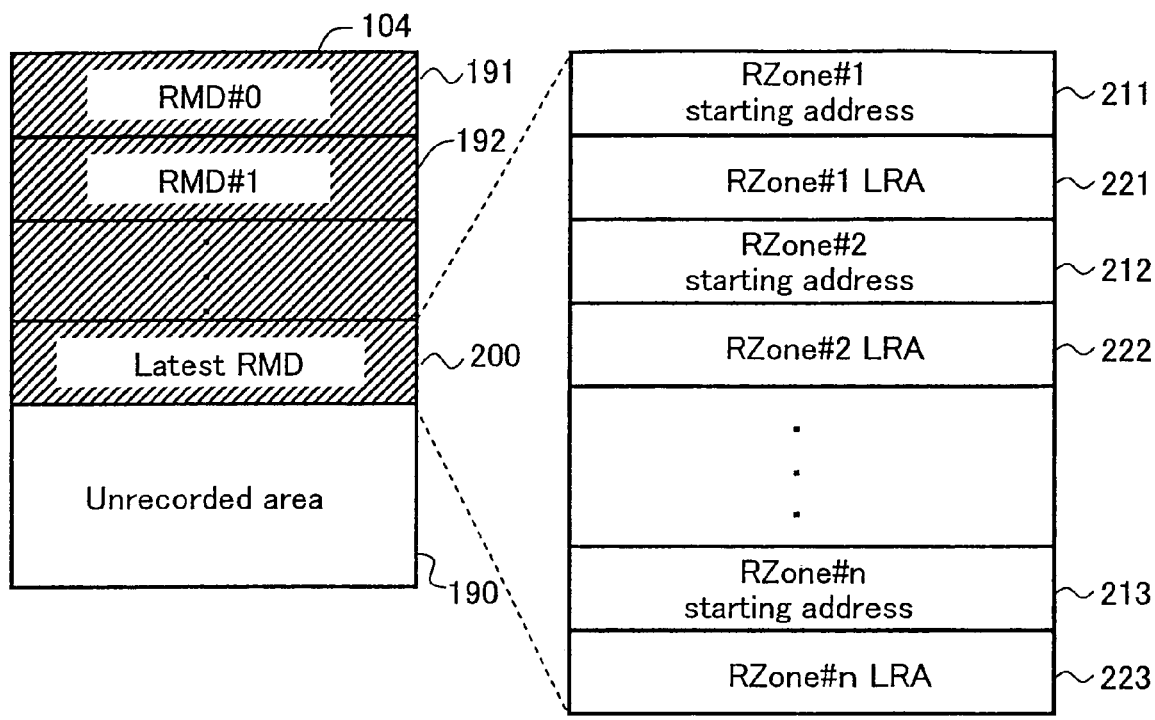
FIG. 2 is a diagram showing data structures of an RMA and an RMD of a DVD-R disc.
Figure 3:
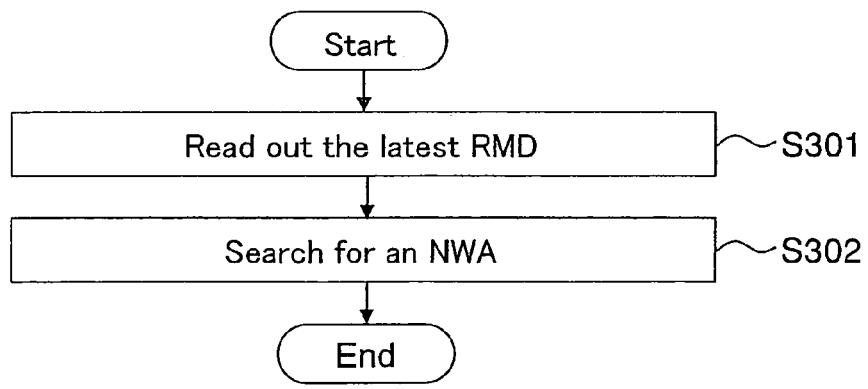
FIG. 3 is a flowchart showing a procedure performed by a recording/reproduction apparatus from when a DVD-R disc is loaded into the recording/reproduction apparatus until when information is recorded thereonto.
Figure 4:
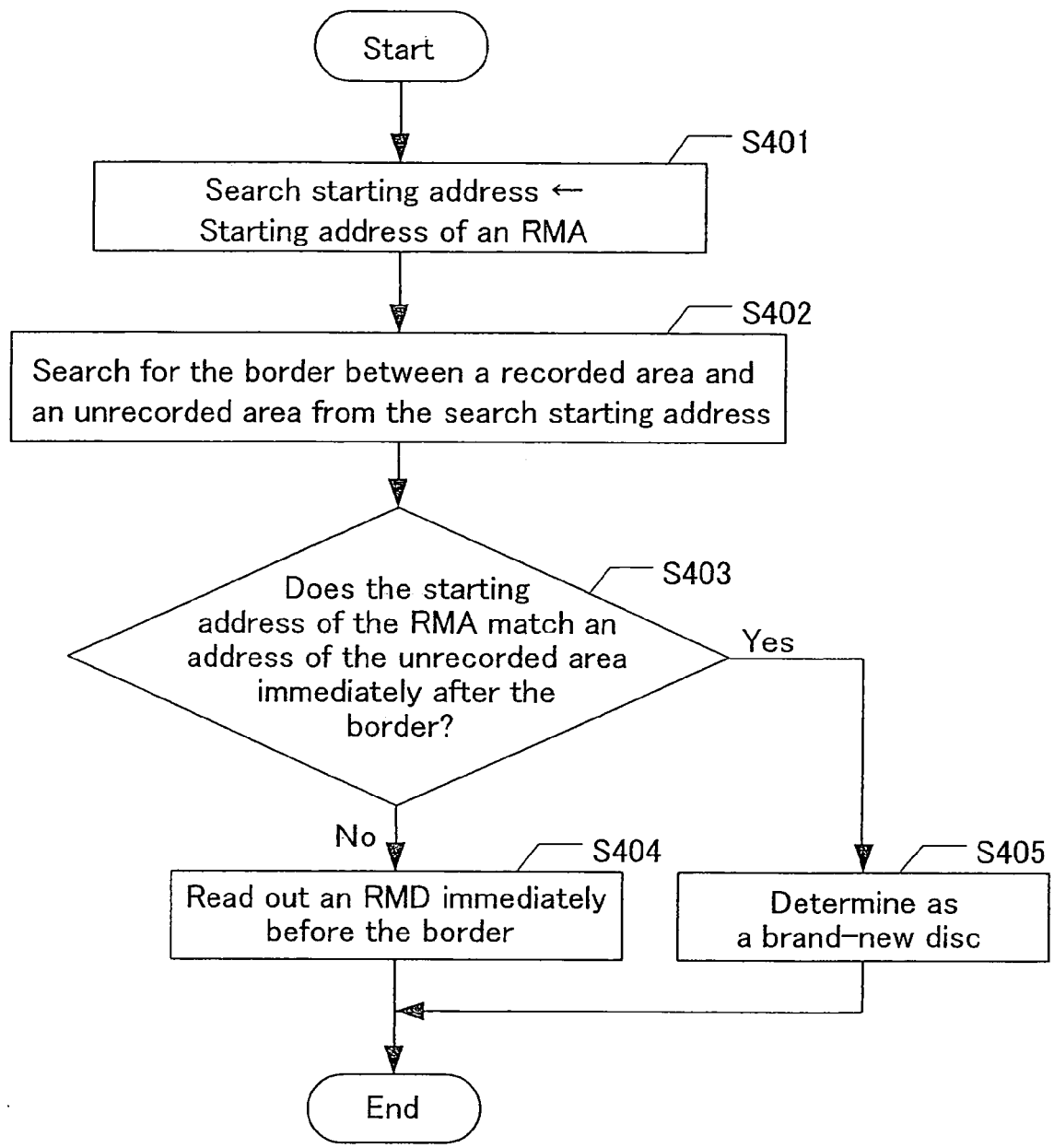
FIG. 4 is a flowchart showing a procedure for reading the latest RMD.
Figure 5:
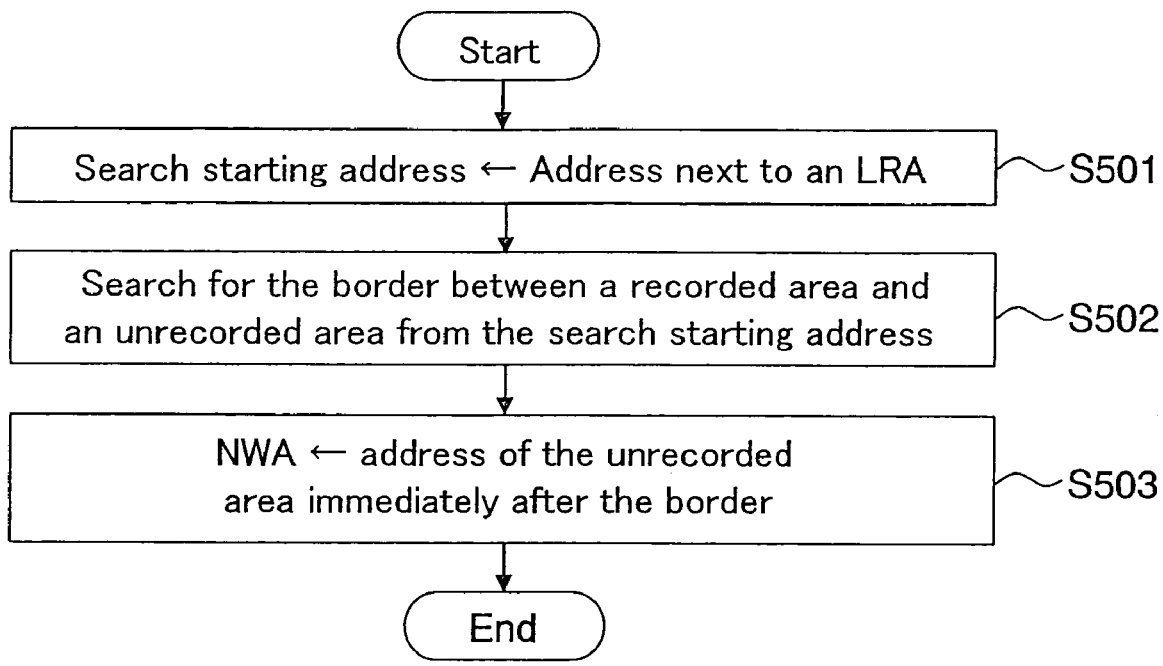
FIG. 5 is a flowchart showing a procedure for searching an NWA of a DVD-R disc.

The data area 903 is divided into a plurality of RZones 910, 911, 912, and 913, as in the data area 106 (FIG. 1). An RMD indicates the recorded state of each RZone.

Figure 10:
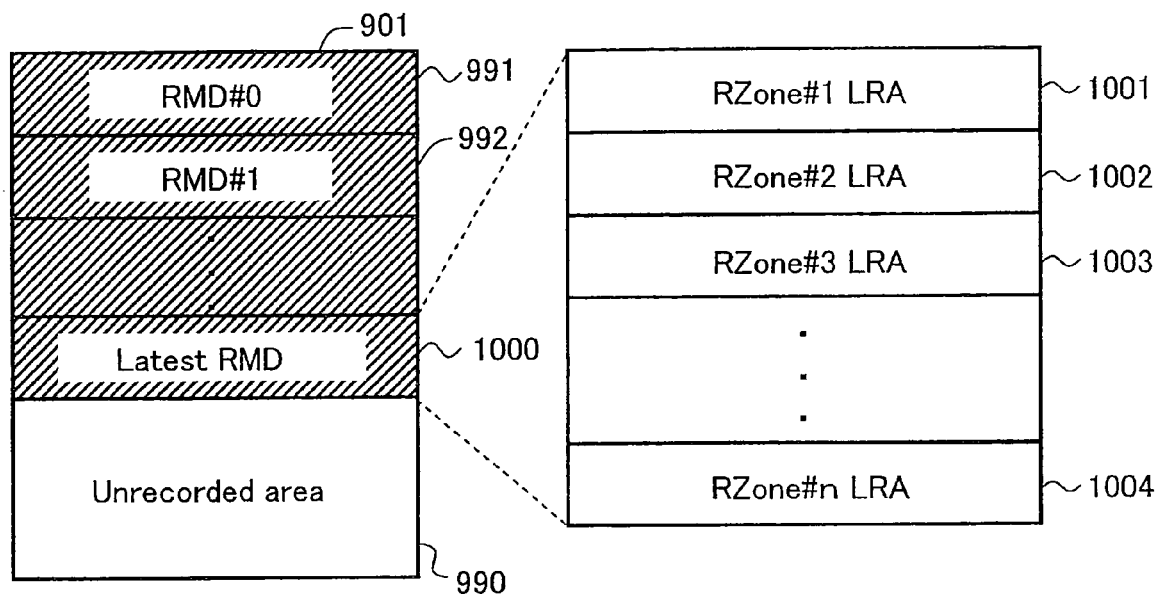
FIG. 10 is a diagram showing data structures of an RMA and an RMD of a write-once information recording medium according to the present invention.

FIG. 10 is a diagram showing the RMA 901. The RMA 901 stores a plurality of RMD 991, 992, and 1000. The latest RMD 1000 is recorded immediately before an unrecorded area 990. The latest RMD 1000 contains LRA's 1001, 1002, 1003, and 1004, each of which indicates the position of a lastly recorded area in the corresponding RZone.

Figure 11:
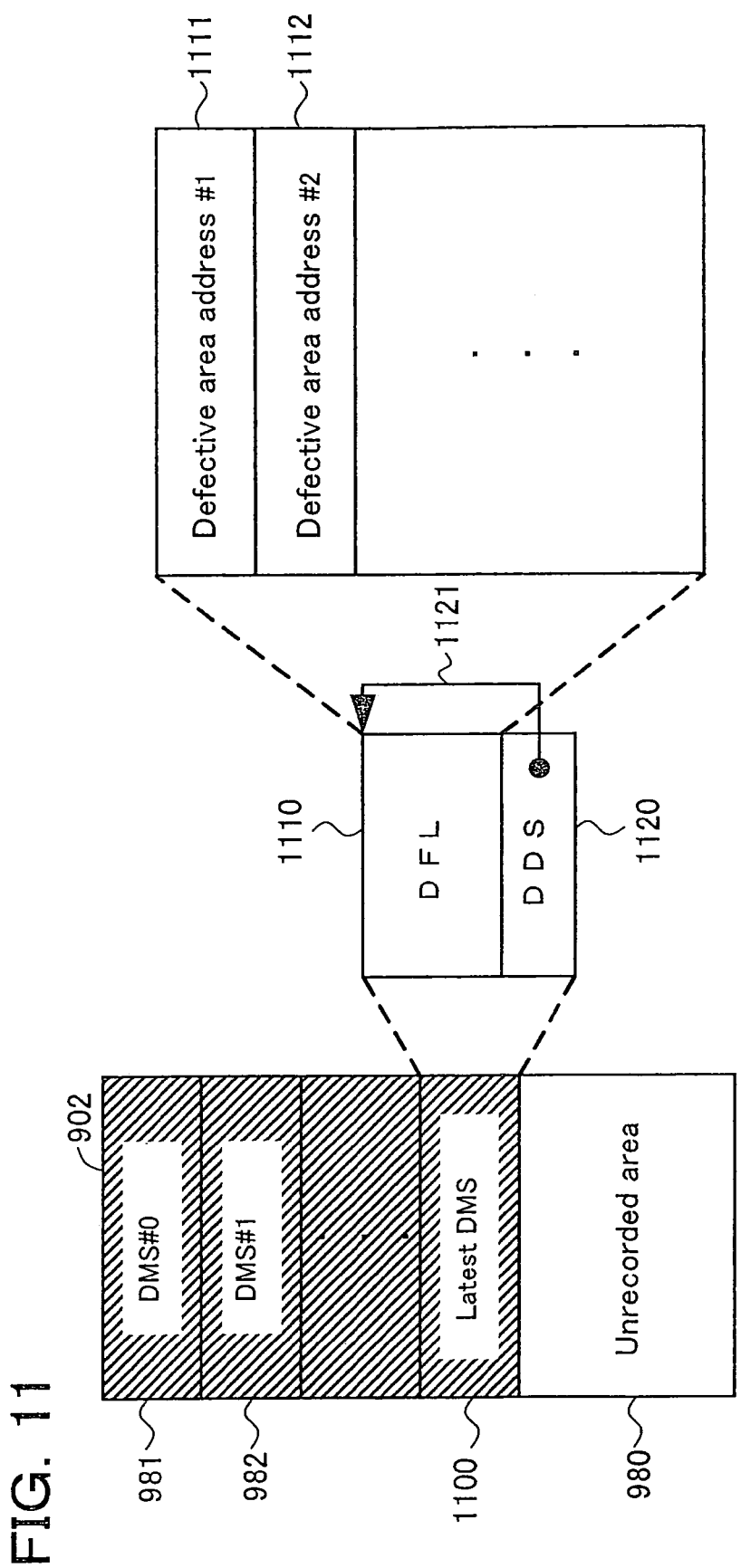
FIG. 11 is a diagram showing data structures of a DMA and a DMS of a write-once information recording medium according to the present invention.

FIG. 11 is a diagram showing a data structure of the DMA 902. The DMA 902 stores a plurality of DMS's 981, 982, and 1100. The DMS's are sequentially recorded from the beginning of the DMA 902. Therefore, the latest DMS 1100 is recorded immediately before an unrecorded area 980. The latest DMS 1100 contains a DFL 1110 and a DDS 1120. The DDS 1120 contains a pointer 1121 indicating the starting position of the DFL 1110. The DFL 1110 contains defective area addresses 1111 and 1112 indicating a defective area. The DMA 904 stores the same information as that in the DMA 902.

Figure 25:
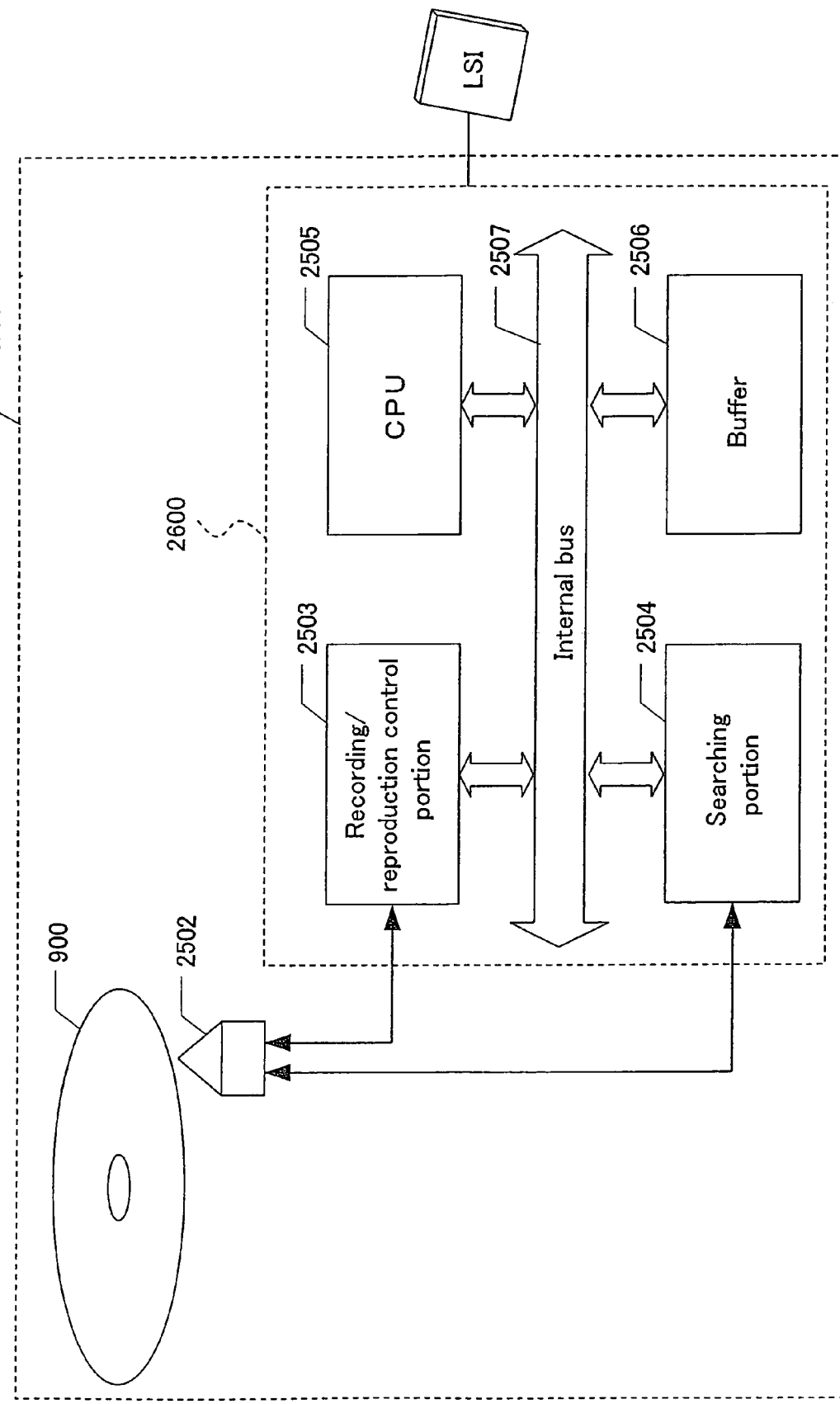
FIG. 25 is a diagram showing an exemplary recording/reproduction apparatus according to the present invention.

FIG. 25 is a block diagram showing a recording/reproduction apparatus 2500 according to Embodiment 1 of the present invention.

The recording/reproduction apparatus 2500 comprises an optical head portion 2502, a recording/reproduction control portion 2503, a searching portion 2504, a CPU (Central Processing Unit) 2505, a buffer 2506, and an internal bus 2507. The write-once information recording medium 900 (FIG. 9) is loaded into the recording/reproduction apparatus 2500. The recording/reproduction apparatus 2500 searches for a writable area in the data area 903 contained in the write-once information recording medium 900.

The CPU 2505 controls the operations of all components of the recording/reproduction apparatus 2500 (e.g., the optical head portion 2502, the recording/reproduction control portion 2503, the searching portion 2504, the buffer 2506, etc.) in accordance with a control program incorporated in the CPU 2505. Note that the CPU 2505 and the recording/reproduction control portion 2503 may be integrated into a single control portion. The recording/reproduction control portion 2503, the searching portion 2504, the CPU 2505, the buffer 2506, and the internal bus 2507 may be, for example, contained in an integrated circuit LSI 2600. The LSI 2600 is provided in the recording/reproduction apparatus 2500.

The optical head portion 2502 performs at least one of recording information onto the write-once information recording medium 900 and reproducing information from the write-once information recording medium 900, by irradiating the write-once information recording medium 900 with laser light. The searching portion 2504 searches for an unrecorded area in the write-once information recording medium 900.

The recording/reproduction control portion 2503 reads out information, which has been recorded in an area having an address specified by the CPU 2505 on the write-once information recording medium 900, using the optical head portion 2502, and stores the information into the buffer 2506. The recording/reproduction control portion 2503 also writes data stored in the buffer 2506 into an area having an address specified by the CPU 2505 using the optical head portion 2502. In addition, when a defective area is detected, the recording/reproduction control portion 2503 outputs an address (defective area address) indicating the defective area to the CPU 2505.

The searching portion 2504 searches for the border between a recorded area and an unrecorded area. The searching portion 2504 performs, for example, the determination method described with reference to FIG. 6. The searching portion 2504 detects the amplitude value of a reproduced signal output by the optical head portion 2502, and determines whether or not the amplitude value exceeds a prescribed value. By this determination step, the searching portion 2504 detects the border between the recorded area and the unrecorded area and obtains a recorded area address (LRA) indicating a position immediately before the border. The searching portion 2504 outputs the obtained recorded area address to the CPU 2505.

The buffer 2506 stores information read out from the write-once information recording medium 900. The buffer 2506 also stores information which is to be written onto the write-once information recording medium 900.

The internal bus 2507 interconnects the recording/reproduction control portion 2503, the searching portion 2504, the CPU 2505, and the buffer 2506.

Figure 12:
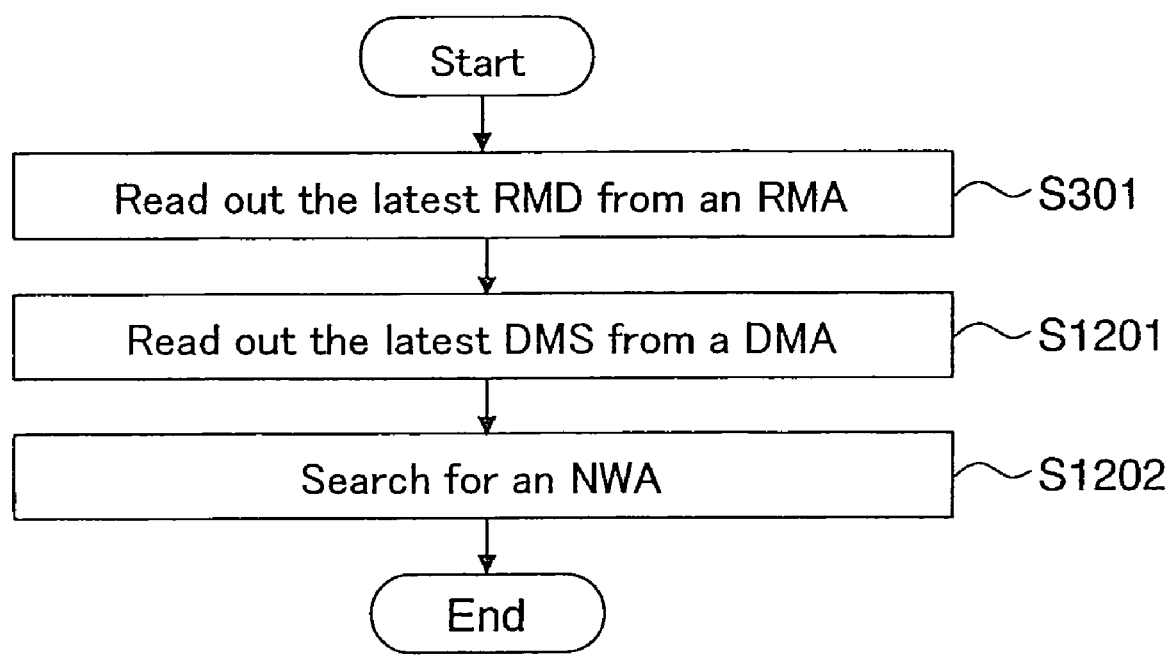
FIG. 12 is a flowchart showing an exemplary procedure performed by a recording/reproduction apparatus from when a write-once information recording medium of the present invention is loaded thereinto until the start of a recording operation.

FIG. 12 is a flowchart showing an exemplary procedure performed by the recording/reproduction apparatus 2500 from when the write-once information recording medium 900 is loaded thereinto until the start of a recording operation.

After the write-once information recording medium 900 is loaded into the recording/reproduction apparatus 2500, the recording/reproduction apparatus 2500 reads the latest RMD. In step 301, the latest RMD 1000 (FIG. 10) is read out from the RMA 901. This operation will be described with reference to FIG. 4.

After the write-once information recording medium 900 is loaded into the recording/reproduction apparatus 2500, the CPU 2505 designates a starting address of the RMA 901 as a search starting address from which the searching portion 2504 starts searching for the border between a recorded area and an unrecorded area. The CPU 2505 instructs the searching portion 2504 to start searching from the starting address of the RMA 901 (step 401).

The searching portion 2504 starts searching for an unrecorded area from the starting address of the RMA 901, detects the border between the recorded area and the unrecorded area, and obtains a recorded area address indicating a position immediately before the border. The searching portion 2504 outputs the obtained recorded area address to the CPU 2505 (step 402).

The CPU 2505 detects the address of the unrecorded area (unrecorded area address) immediately after the border, based on the obtained recorded area address, and determines whether or not the unrecorded area address matches the starting address of the RMA 901 (step 403).

When the two addresses do not match each other in step 403, the CPU 2505 designates the address of an RMD recorded position immediately before the detected border, and instructs the recording/reproduction control portion 2503 to reproduce an RMD recorded at that position. The recording/reproduction control portion 2503 uses the optical head portion 2502 to read the designated RMD (here, the latest RMD 1000), and stores the data into the buffer 2506 (step 404).

When the two addresses match each other in step 403, the CPU 2505 determines that the loaded write-once information recording medium is brand-new, and stores a flag indicating the brand-new state into the buffer 2506 (step 405).

Figure 13:
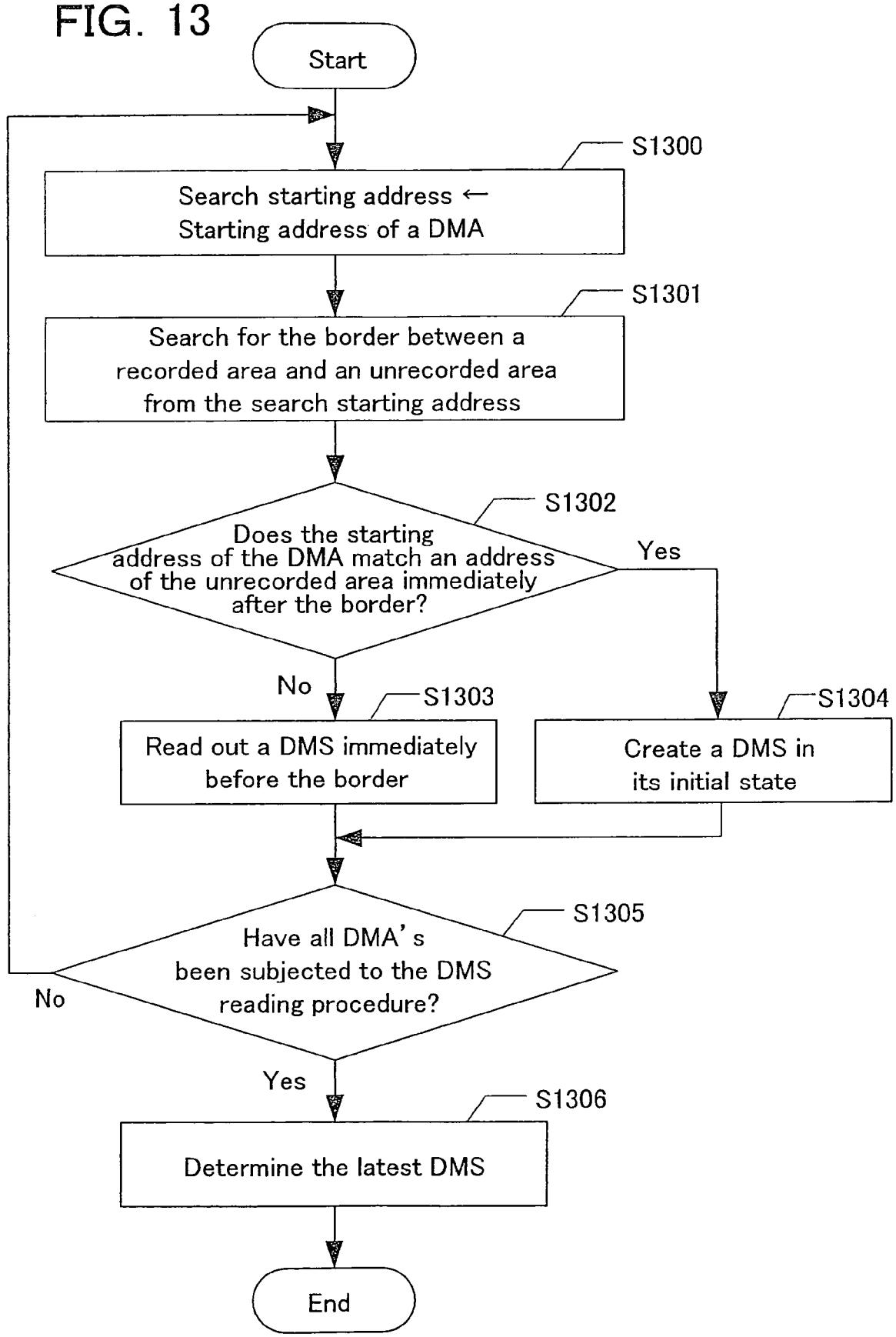
FIG. 13 is a flowchart showing an exemplary procedure for reading out the latest DMS according to the present invention.

After the latest RMD 1000 is read out, the recording/reproduction apparatus 2500 reads the latest DMS from the DMA's 902 and 904 (step 1201). This operation will be described with reference to FIG. 13. FIG. 13 is a flowchart showing an exemplary procedure of step 1201 (FIG. 12).

The CPU 2505 designates the starting address of the DMA 902 as a search starting address from which the searching portion 2504 starts searching for the border between a recorded area and an unrecorded area. The CPU 2505 instructs the searching portion 2504 to search for the border from the starting address of the DMA 902 (step 1300).

The searching portion 2504 starts searching for an unrecorded area from the starting address of the DMA 902, detects the border between a recorded area and the unrecorded area, and obtains and outputs a recorded area address indicating a position immediately before the border to the CPU 2505 (step 1301).

The CPU 2505 detects an address (unrecorded area address) of the unrecorded area immediately after the border based on the obtained recorded area address, and determines whether or not the unrecorded area address matches the starting address of the DMA 902 (step 1302).

When the two addresses do not match each other in step 1302 (a DMS has been recorded), the CPU 2505 designates the address of a DMS recorded position immediately before the detected border, and instructs the recording/reproduction control portion 2503 to reproduce the DMS recorded at the position. The recording/reproduction control portion 2503 uses the optical head portion 2502 to read the designated DMS (here, the latest DMS 1100), and stores the data into the buffer 2506 (step 1303).

When the two addresses match each other (a DMS has not been recorded), the CPU 2505 stores a DMS in its initial state where a defective area address is 0, into the buffer 2506 (step 1304).

The CPU 2505 determines whether or not the DMS have been read out from all DMA's. When a DMS has not been read out from any of the DMA's, the CPU 2505 instructs the searching portion 2504 to search for the borders in the remaining DMA's (step 1305), and the process returns to step 1300.

When a DMS has been read out from all of the DMA's, the CPU 2505 selects the latest DMS from a plurality of DMS's stored in the buffer 2506. For example, when a DMS contains an update counter value indicating the number of updates, the CPU 2505 compares the update counter values read from each DMA with each other. In this case, the CPU 2505 determines a DMS having the greatest update counter value to be the latest DMS, and causes the latest DMS to remain in the buffer 2506.

In this embodiment, a DMS having the greatest update counter value is assumed to be the latest DMS. Alternatively, any operation may be used as long as it can determine whether or not a DMS is the latest. For example, a DMS storing the greatest defective area address among defective area addresses stored in the DMS's may be determined to be the latest DMS. Alternatively, for example, the size of the DFL recording area is detected and a DMS having the greatest size may be determined to be the latest DMS.

Figure 14:
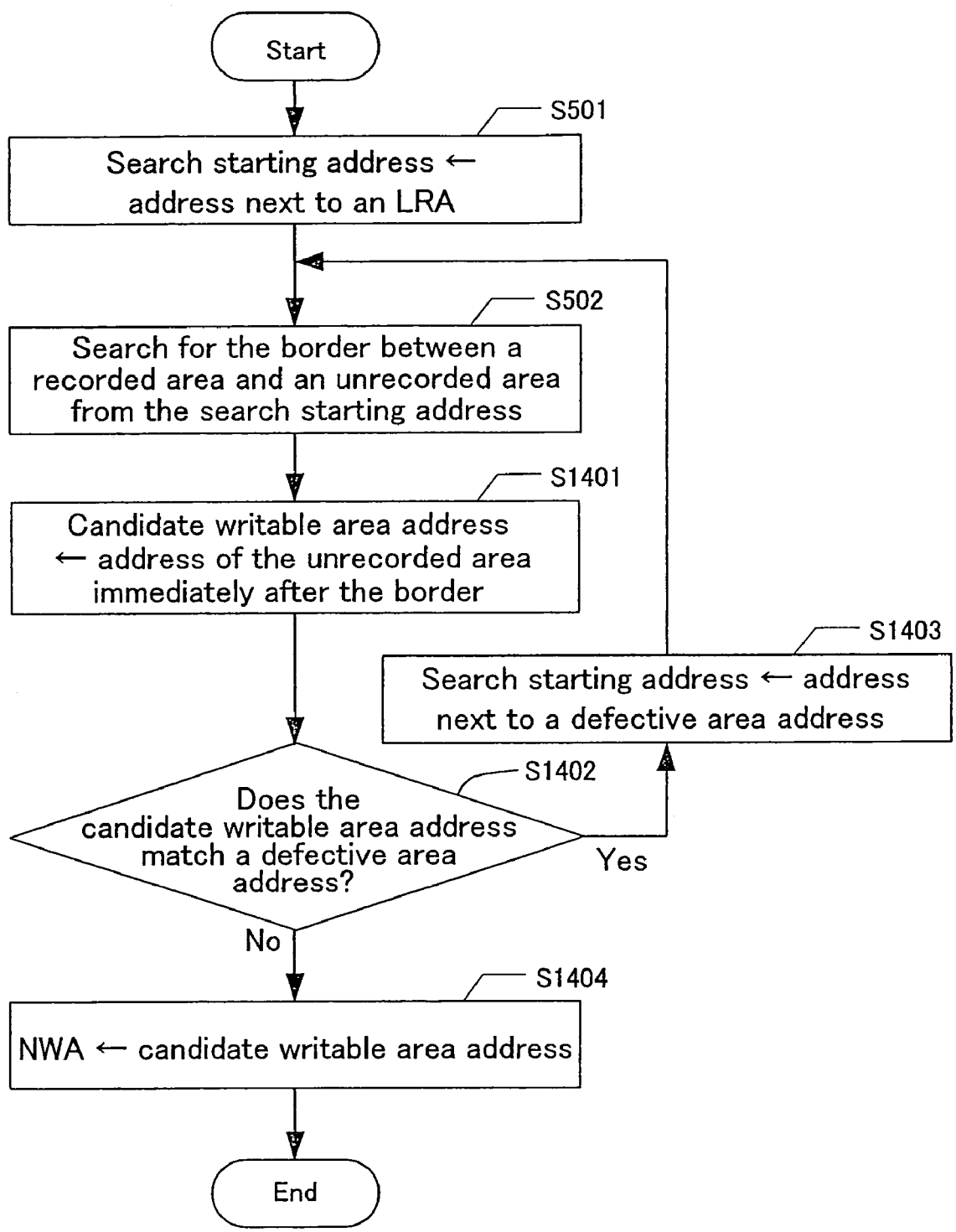
FIG. 14 is a flowchart showing an exemplary procedure for searching for an NWA according to the present invention.

After the latest DMS is read out, the recording/reproduction apparatus 2500 searches for a writable address (NWA). In step 1202 (FIG. 12), a NWA is detected in a writable RZone with reference to the RMD and the DMS read out from step 301 and step 1201. This operation will be described with reference to FIG. 14. FIG. 14 is a flowchart showing an exemplary procedure of step 1202 of FIG. 12.

The CPU 2505 reads out an LRA from an RMD stored in the buffer 2506, and determines an address after the LRA (e.g., an address next to the LRA). Here, the CPU 2505 instructs the searching portion 2504 to search for the address next to the LRA as a search starting address (step 501).

The searching portion 2504 searches for an unrecorded area using an address after the LRA as a reference. Here, the searching portion 2504 starts searching for an unrecorded area from an address next to the LRA toward addresses following that address, detects the border between a recorded area and an unrecorded area, and obtains a recorded area address indicating a position immediately before the border. The searching portion 2504 outputs the obtained recorded area address to the CPU 2505 (step 502).

The CPU 2505 detects the address (unrecorded area address) of an unrecorded area immediately after the border from the obtained recorded area address, and sets the unrecorded area address to be a candidate address indicating a candidate for a writable area (step 1401). The CPU 2505 determines whether or not a defective area address indicating an address matching the candidate address is present in a DMS stored in the buffer 2506 (step 1402).

When it is determined in step 1402 that such a defective area address is not present, the CPU 2505 determines the candidate address to be a NWA, and determines an area indicated by the NWA to be a writable area (step 1404).

When it is determined in step 1402 that such a defective area address is present, the CPU 2505 instructs the searching portion 2504 to perform a search using an address after the defective area address (=the current candidate address) as a search starting address (step 1403).

Returning to step 502, the searching portion 2504 searches for another unrecorded area using an address after the defective area address (=the current candidate address) as a reference. Here, the searching portion 2504 starts searching an unrecorded area from an address next to the defective area address towards addresses following that address. The searching portion 2504 detects the border between a recorded area and an unrecorded area, and obtains a recorded area address indicating a position immediately before the border. The searching portion 2504 outputs the obtained recorded area address to the CPU 2505.

The CPU 2505 and the searching portion 2504 repeatedly perform operations indicated in step 501 to step 1403 until detection of a candidate address which does not match a defective area address.

As described above, according to this embodiment of the present invention, by determining whether or not a detected unrecorded area matches a defective area, a defective area is prevented from being incorrectly determined to be a writable area. Therefore, information can be constantly written in a normal recording area.

Although the searching portion 2504 obtains a recorded area address immediately before the border between a recorded area and an unrecorded area in this embodiment, an unrecorded area address immediately after the border may be obtained.

By using a pointer indicating the starting position of a DFL, the length of the DFL can be variable, thereby making it possible to reduce the size of a DMS.

Although the write-once information recording medium of FIG. 9 is described as an example in Embodiment 1, each area may be located anywhere on a medium. In addition, the number of areas of each type is not particularly limited as long as it is at least one.

Although a DMS is read out after an RMD is read out in Embodiment 1, either a DMS or an RMD may be read out earlier as long as it is before searching for an NWA.

Embodiment 2

Figure 15:
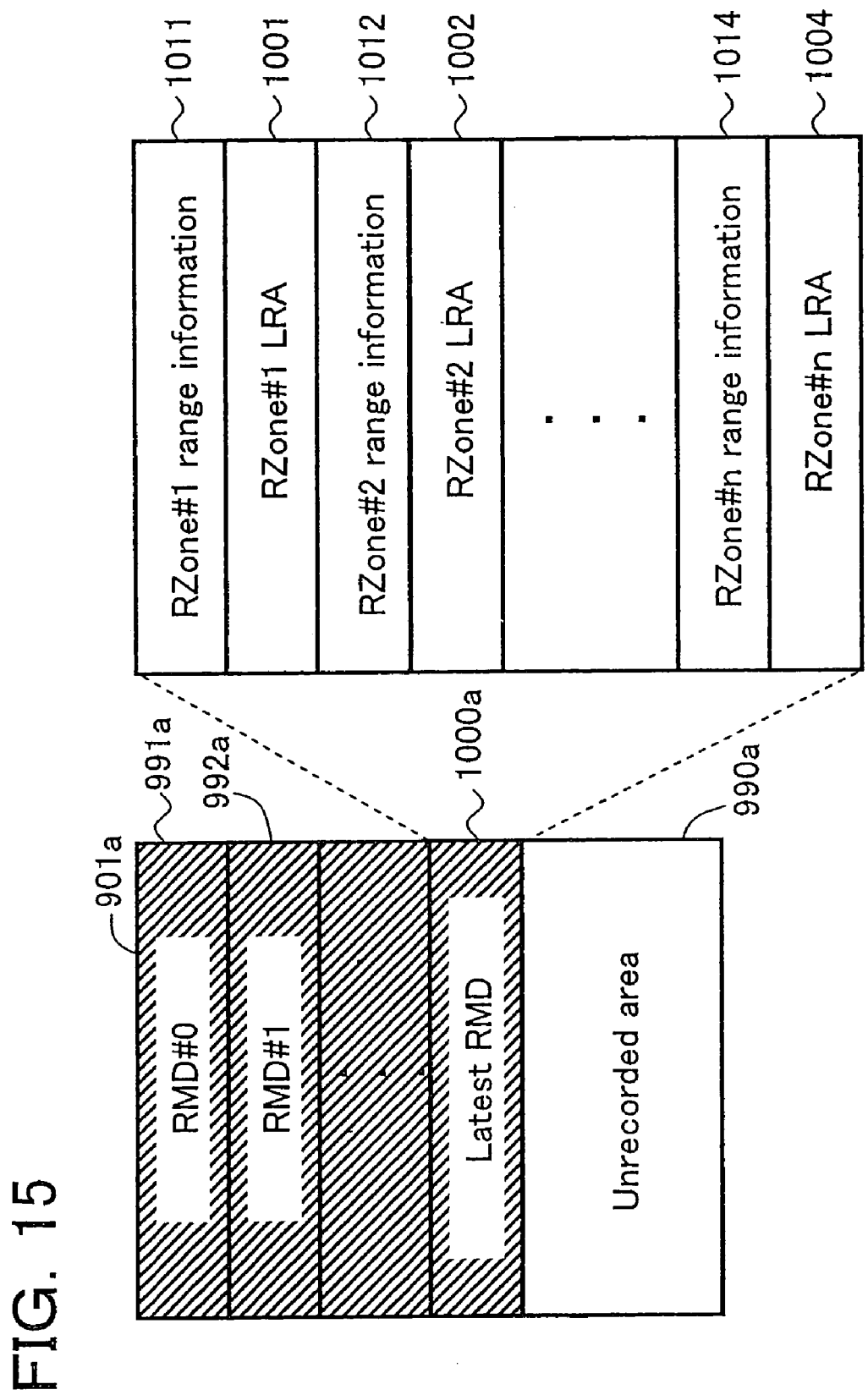
FIG. 15 is a diagram showing data structures of an RMA and an RMD of a write-once information recording medium according to the present invention.

FIG. 15 is a diagram showing an RMA 901a which is a variation of the RMA 901. The data structure described in FIGS. 9 and 11 is common to the RMA 901a and the RMA 901.

The RMA 901a stores a plurality of RMD's 991a, 992a, and 1000a. The latest RMD 1000a is recorded immediately before an unrecorded area 990a. The latest RMD 1000a contains LRA's 1001, 1002, and 1004 indicating the positions of lastly recorded areas in the respective RZones, and RZone range information 1011, 1012, and 1014 indicating the ranges of respective RZones.

Among procedures performed by a recording/reproduction apparatus from when a write-once information recording medium is loaded thereinto until the start of a recording operation, from step 301 to step 1201 of FIG. 12 are common to Embodiments 1 and 2.

Figure 16:
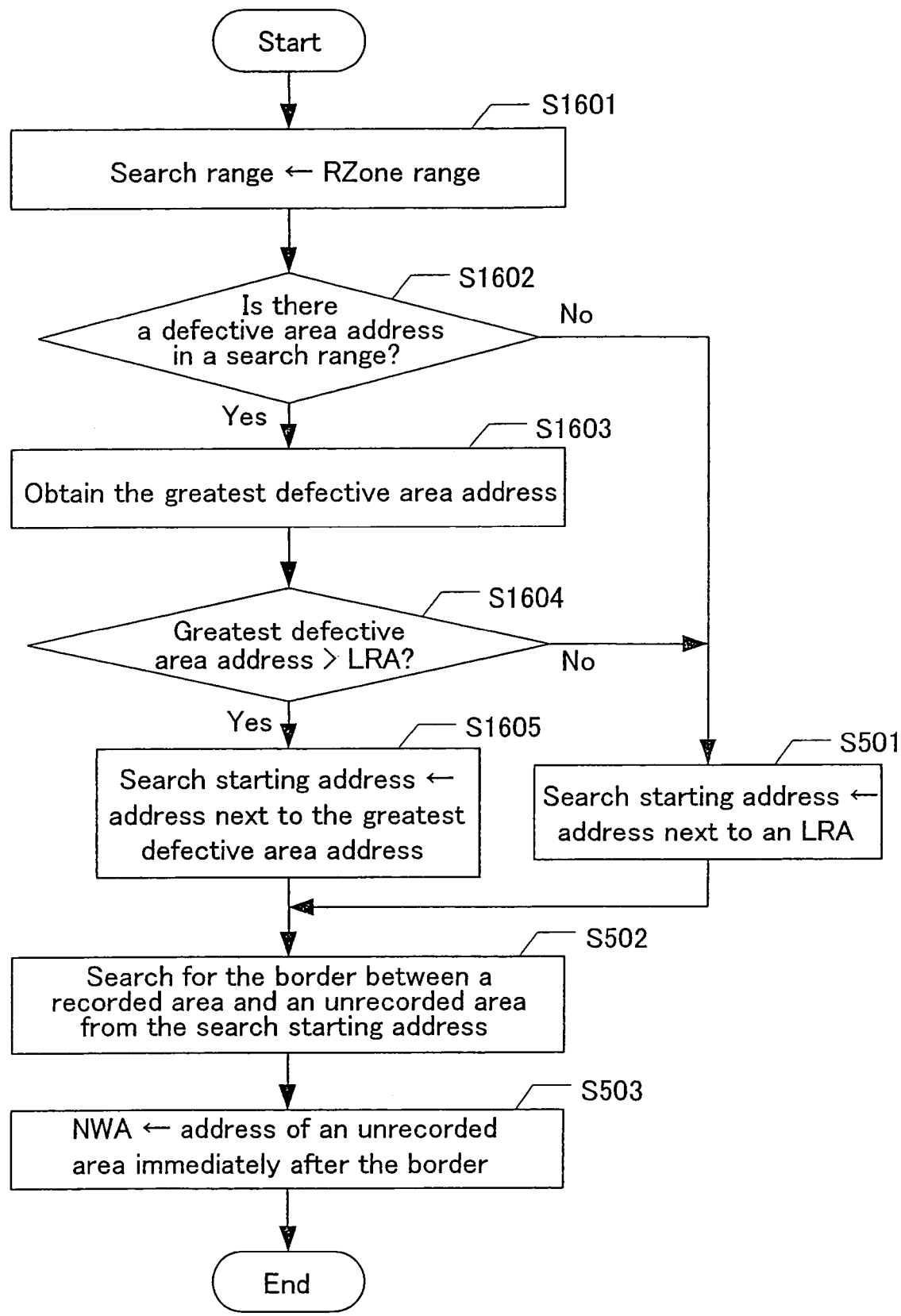
FIG. 16 is a flowchart showing an exemplary procedure for searching for an NWA according to the present invention.

FIG. 16 is a flowchart showing a variation of step 1202 of FIG. 12.

In step 1601, the CPU 2505 designates the range of an RZone, into which information is to be recorded from now, as a search range, in which an NWA is to be searched for. The range of an RZone is obtained based on RZone range information contained in the RMD 901*a*. For example, when the RZone range information indicates the starting address of an RZone, the RZone ranges from the starting address of an RZone, in which an NWA is to be searched for, to an address immediately before the starting address of the next RZone. When the RZone range information indicates the last address of an RZone, the RZone ranges from an address next to the last address of an RZone located immediately before an RZone, in which an NWA is to be searched for, to the last address of the RZone, in which an NWA is to be searched for. When the RZone range information indicates both the starting address and the last address of an RZone, the RZone ranges from the starting address to the last address of an RZone, in which an NWA is to be searched for.

In step 1602, the CPU 2505 determines whether or not there is at least one defective area in a prescribed recording range in the data area 106 (here, the range of an RZone, in which an NWA is to be searched for). Specifically, the CPU 2505 determines whether or not there is a defective area address indicating an address within the range of an RZone, in which an NWA is to be searched for, among defective area addresses in a DMS.

When there is a defective area address indicating an address within the range of an RZone, in which an NWA is to be searched for, the process goes to step 1603. When not, the process goes to step 501.

In step 1603, the CPU 2505 detects a defective area address (the greatest defective area address), which indicates a defective area located at the last address of at least one defective areas in a prescribed recording range.

In step 1604, the CPU 2505 compares an LRA corresponding to an RZone, in which an NWA is to be searched for, with the greatest defective area address detected. When the greatest defective area address is greater than the LRA, the process goes to step 1605. When the LRA is smaller than the greatest defective area address, the process goes to step 501. When the LRA is equal to the greatest defective area address, the process goes to either step 1605 or step 501.

In step 1605, the CPU 2505 designates an address next to the greatest defective area address as a search starting address.

In step 501, the CPU 2505 designates an address next to the LRA as a search starting address.

The CPU 2505 sets an address, located after both the greatest defective area address and the LRA to be a candidate address, via step 1605 or step 501.

In step 502, the searching portion 2504 searches for an unrecorded area using the candidate address (search starting address) as a reference. Here, the searching portion 2504 starts searching for an unrecorded area from the candidate address toward addresses following the candidate address, detects the border between a recorded area and an unrecorded area, and obtains a recorded area address indicating a position immediately before the border. The searching portion 2504 outputs the obtained recorded area address to the CPU 2505.

In step 503, the CPU 2505 detects the address of an unrecorded area immediately after the border based on the result of detection in step 502 and determines the address as an NWA, and determines an area indicated by the NWA as a writable area.

Figure 17:
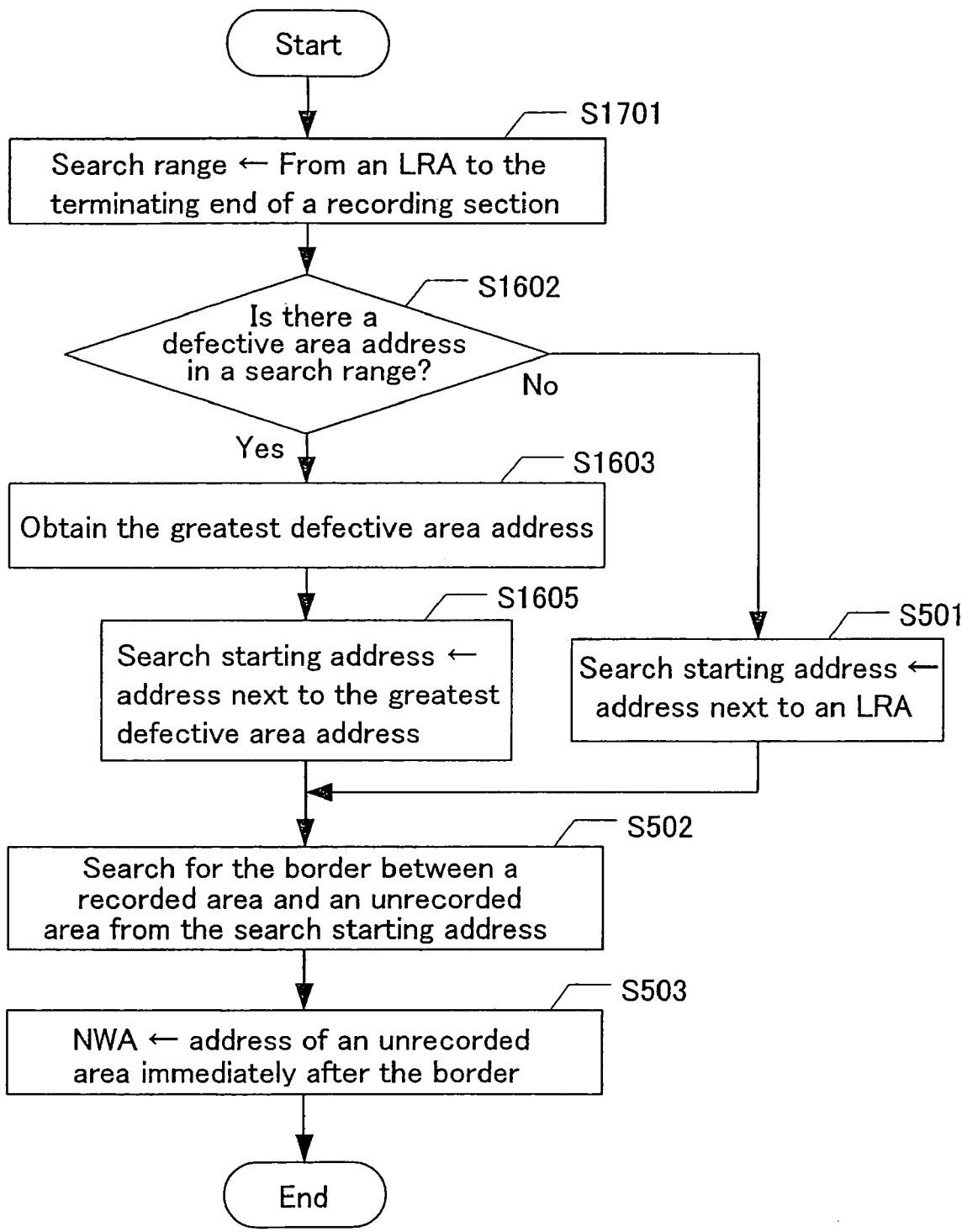
FIG. 17 is a flowchart showing an exemplary procedure for searching for an NWA according to the present invention.

FIG. 17 is a flowchart showing an exemplary procedure of step 1202 of FIG. 12. The flowchart of FIG. 17 is the same as that of FIG. 16, except that step 1701 is performed instead of step 1601 and step 1604 is omitted.

In step 1701, the CPU 2505 designates, as a search range in which an NWA is to be searched for, a range from an LRA corresponding to an RZone, into which information is to be recorded from now, to the terminating end of the RZone. The range of the RZone is obtained based on RZone range information contained in the RMD 901*a*. When the RZone range information indicates the starting address of the RZone, the search range extends from the LRA to an address immediately before the starting address of an RZone next to the RZone, in which an NWA is to be searched for. When RZone range information indicates the last address of an RZone, a search range extends from the LRA to the last address of the RZone, in which an NWA is to be searched for.

In step 1602, the CPU 2505 determines whether or not there is at least one defective area within a prescribed recording range in the data area 106 (here, a range from an LRA corresponding to an RZone, into which information is to be recorded from now, to the terminating end of the RZone). Specifically, the CPU 2505 determines whether or not there is a defective area address indicating an address within a prescribed recording range in defective area addresses contained in a DMS.

In step 1603, the CPU 2505 detects a defective area address (greatest defective area address) indicating the address of a defective area located at the last address of at least one defective areas present in a prescribed recording range.

In the procedure of FIG. 17, the starting point of a search range is set to be an LRA. Therefore, when there is the greatest defective area address, the greatest defective area address is always greater than or equal to the LRA. Thus, the procedure of step 1604 (FIG. 16) is omitted.

The subsequent steps are the same as those of FIG. 16, and their description is omitted.

According to Embodiment 2 of the present invention, there is no defective area already detected between a search starting address and an NWA. Therefore, only a single search operation for the border between a recorded area and an unrecorded area is required. A procedure for determining whether or not a detected unrecorded area address is a defective area may be performed in a semiconductor memory. A procedure for searching for the border between a recorded area and an unrecorded area is performed on an optical disc. Therefore, when the determining procedure and the searching procedure are repeatedly performed, it takes a long time to determine an NWA. In this embodiment, it is not necessary to repeatedly perform the determining procedure and the searching procedure, whereby an NWA can be determined more quickly.

Embodiment 3

Figure 18:
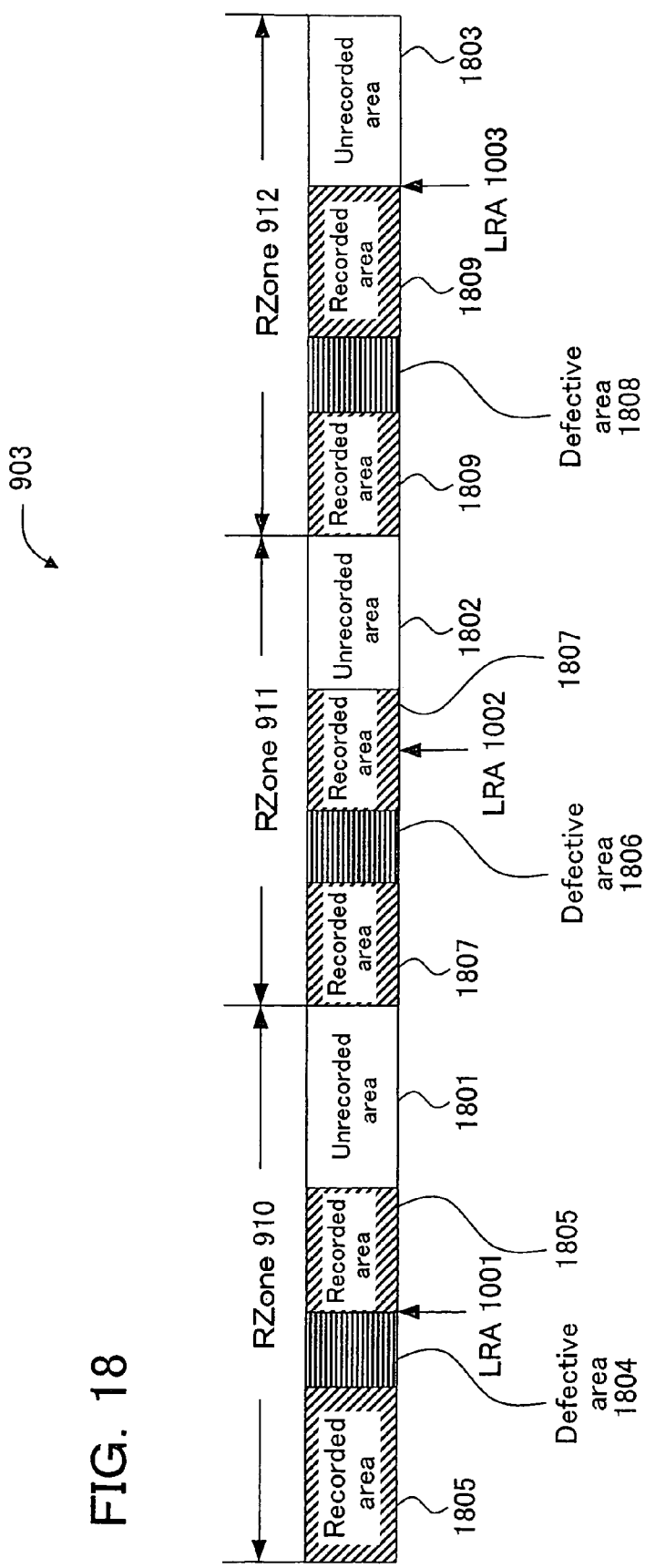
FIG. 18 is a diagram showing a feature of a write-once information recording medium according to the present invention.

FIG. 18 is a diagram showing the RZones 910, 911, and 912 which are a portion of the data area 903. The RZone 910 contains a recorded area 1805 and an unrecorded area 1801. The RZone 911 contains a recorded area 1807 and an unrecorded area 1802. The RZone 912 contains a recorded area 1809 and an unrecorded area 1803.

The latest RMD 1000 stores the LRA 1001 of the RZone 910, the LRA 1002 of the RZone 911, and the LRA 1003 of the RZone 912. The LRA 1001 indicates the last address of a defective area 1804. The LRA 1002 is located after a defective area 1806, indicating an address which is not the last address of the recorded area 1807. The LRA 1003 indicates a position immediately before the unrecorded area 1803, i.e., the last address of the recorded area 1809.

As shown in FIG. 18, there is no detected defective area in a recorded area following the LRA of each RZone. In other words, the LRA of an RZone indicates an address on or after a defective area address indicating a defective area present in the RZone.

Figure 19:
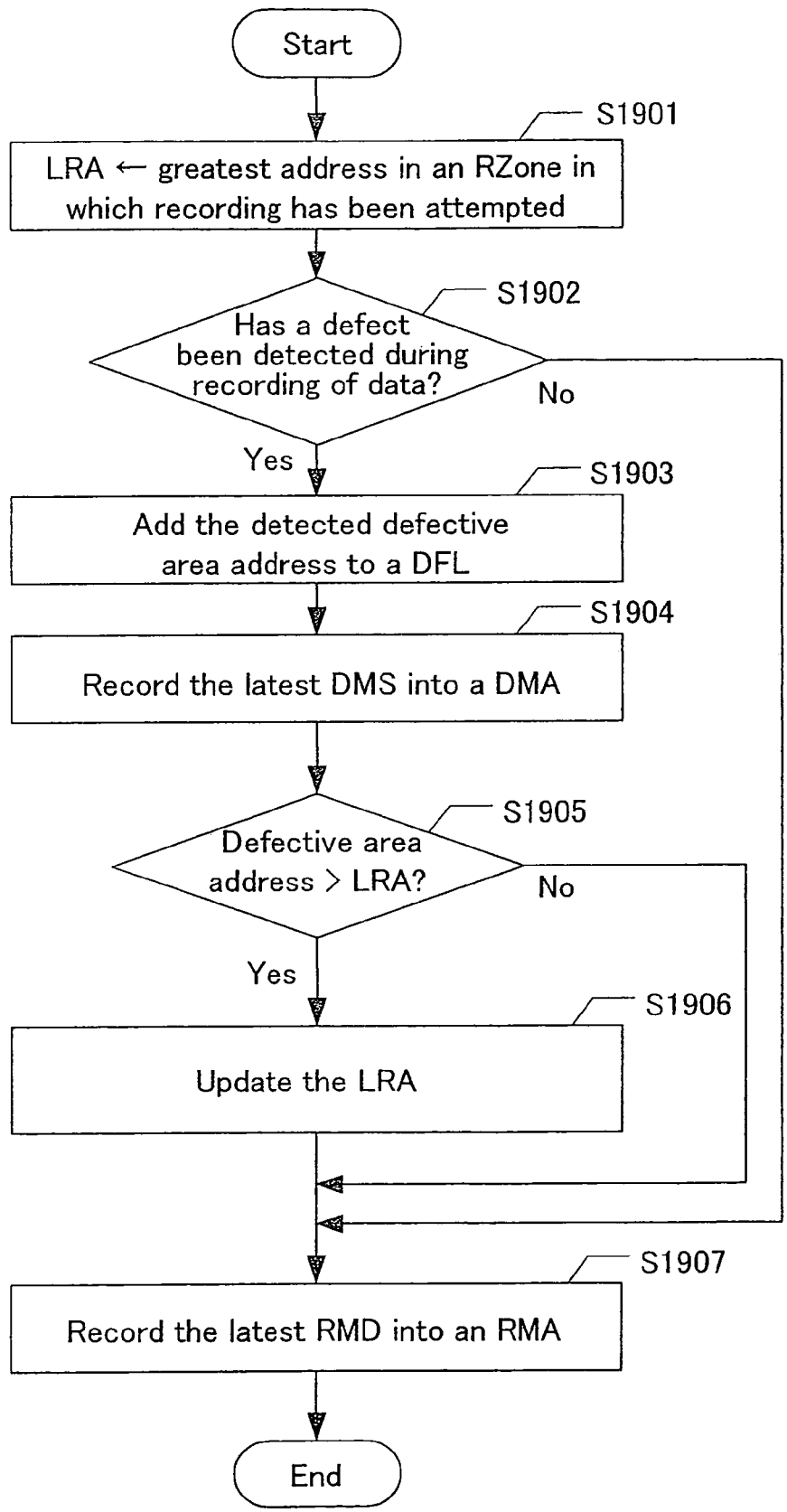
FIG. 19 is a flowchart showing an exemplary procedure for updating a recording management area according to the present invention.

FIG. 19 is a flowchart showing an exemplary procedure for updating recording management information, which is performed by the recording/reproduction apparatus 2500.

The CPU 2505 sets the greatest address in an RZone, into which the recording/reproduction control portion 2503 is instructed to record information, to be an LRA, and rewrites an LRA within an RMD stored in the buffer 2506 (step 1901).

The recording/reproduction control portion 2503 determines whether or not a defect has been found during recording of user data (step 1902). When no defect has been found, the process goes to step 1907. When a defect has been found, the recording/reproduction control portion 2503 outputs an address indicating the detected defect (defective area address) to the CPU 2505. The CPU 2505 adds the detected defective area address into a DFL stored in the buffer 2506 (step 1903).

The CPU 2505 instructs the recording/reproduction control portion 2503 to record, into a DMA, the latest DMS which has been updated by adding the defective area address to the DFL. The recording/reproduction control portion 2503 records the updated latest DMS into the DMA's 902 and 904 (step 1904).

The CPU 2505 determines whether or not the LRA of an RZone indicates an address on or after a defective area address indicating a defective area present in the RZone (step 1905). When the LRA indicates an address on or after the defective area address, the process goes to step 1907. When the LRA does not indicate an address on or after the defective area address, the LRA is updated so that the updated LRA indicates an address on or after the defective area address (step 1906).

The CPU 2505 instructs the recording/reproduction control portion 2503 to record the latest RMD, which has been updated by rewriting the LRA, into the RMA 901. The recording/reproduction control portion 2503 records the updated latest RMD into the RMA 901 (step 1907).

According to this embodiment, a write-once information recording medium is realized such that there is no detected defective area in a recorded area after an LRA contained in the latest RMD.

As described above, the greatest address in an RZone in which recording has been attempted in step 1901 is assumed to be an LRA. Alternatively, as shown in FIG. 18, an LRA may be an address at which there is no detected defective area in a recorded area after the LRA in an RZone.

According to Embodiment 3 of the present invention, there is no detected defective area in a recorded area after an LRA contained in the latest RMD. Therefore, only a one-time procedure for searching the border between a recorded area and an unrecorded area is required, thereby making it possible to reduce the time spent finding an NWA. In addition, by this updating method, a write-once information recording medium having the data structure shown in FIG. 18 is realized.

In Embodiment 3, after a defect has been detected, a defective area address is added to a DFL, and the latest DMS is recorded into a DMA. Alternatively, by simply updating an LRA after a defect has been detected, the latest RMD clearly contains an LRA followed by a recorded area in which there is no detected defective area.

The updated latest RMD and DMS is preferably recorded until a medium is unloaded from a recording/reproduction apparatus. Particularly, the updated values are held in the apparatus, and are recorded into an RMA or DMA until the medium is unloaded.

Embodiment 4

Figure 20:
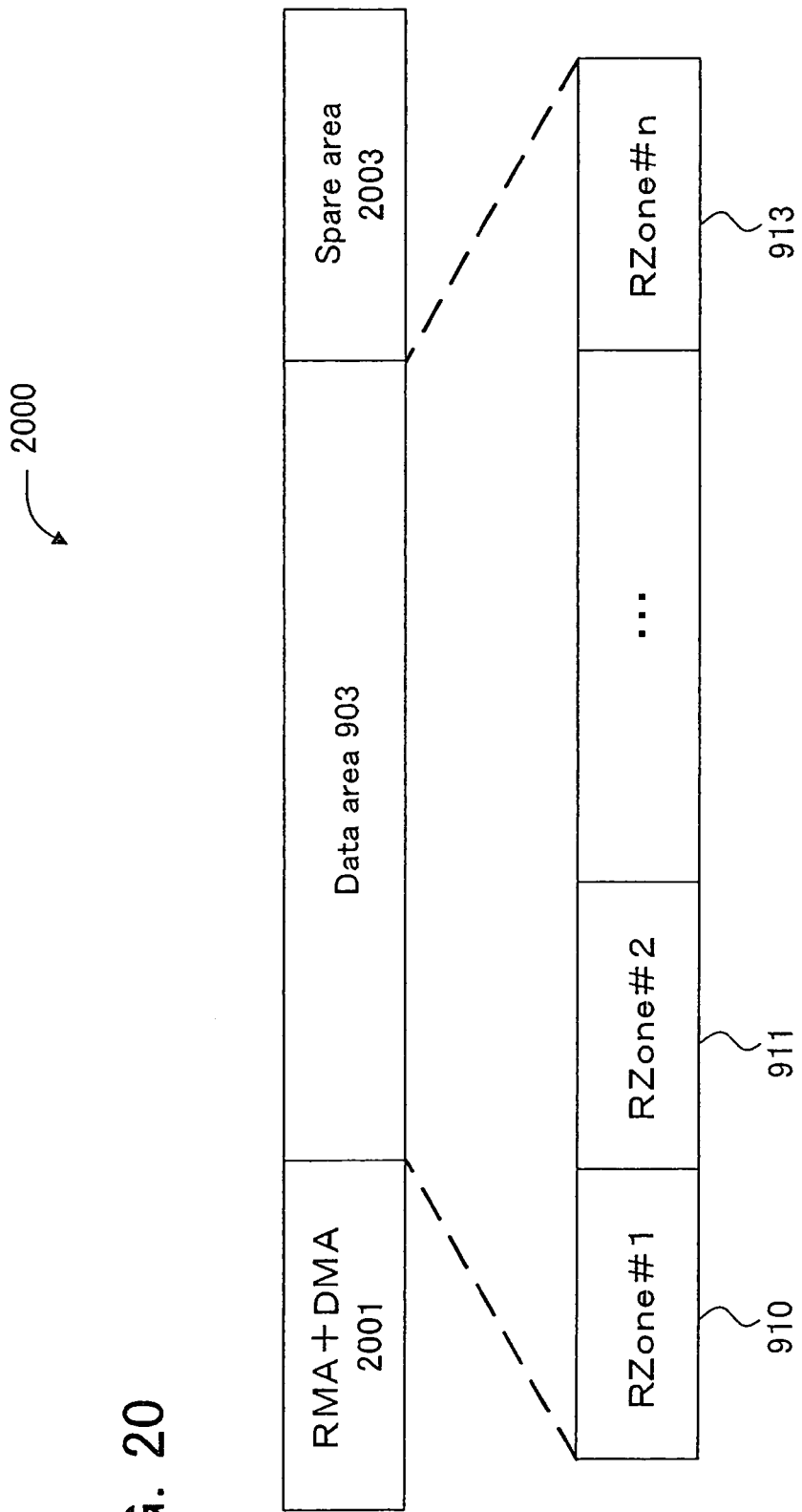
FIG. 20 is a diagram showing a data structure of a write-once information recording medium according to the present invention.

FIG. 20 is a diagram showing a write-once information recording medium 2000 according to Embodiment 4 of the present invention. The write-once information recording medium 2000 comprises a data area 903, an RMA+DMA 2001 for recording recording management information and defect management information, and a spare area 2003 which is a replacement destination of a defective area. Information indicating the recorded states of a plurality of RZones contained in the data area 903 is recorded in the RMA+DMA 2001. Note that the spare area 2003 is also contained in a write-once information recording medium 900.

Figure 21:
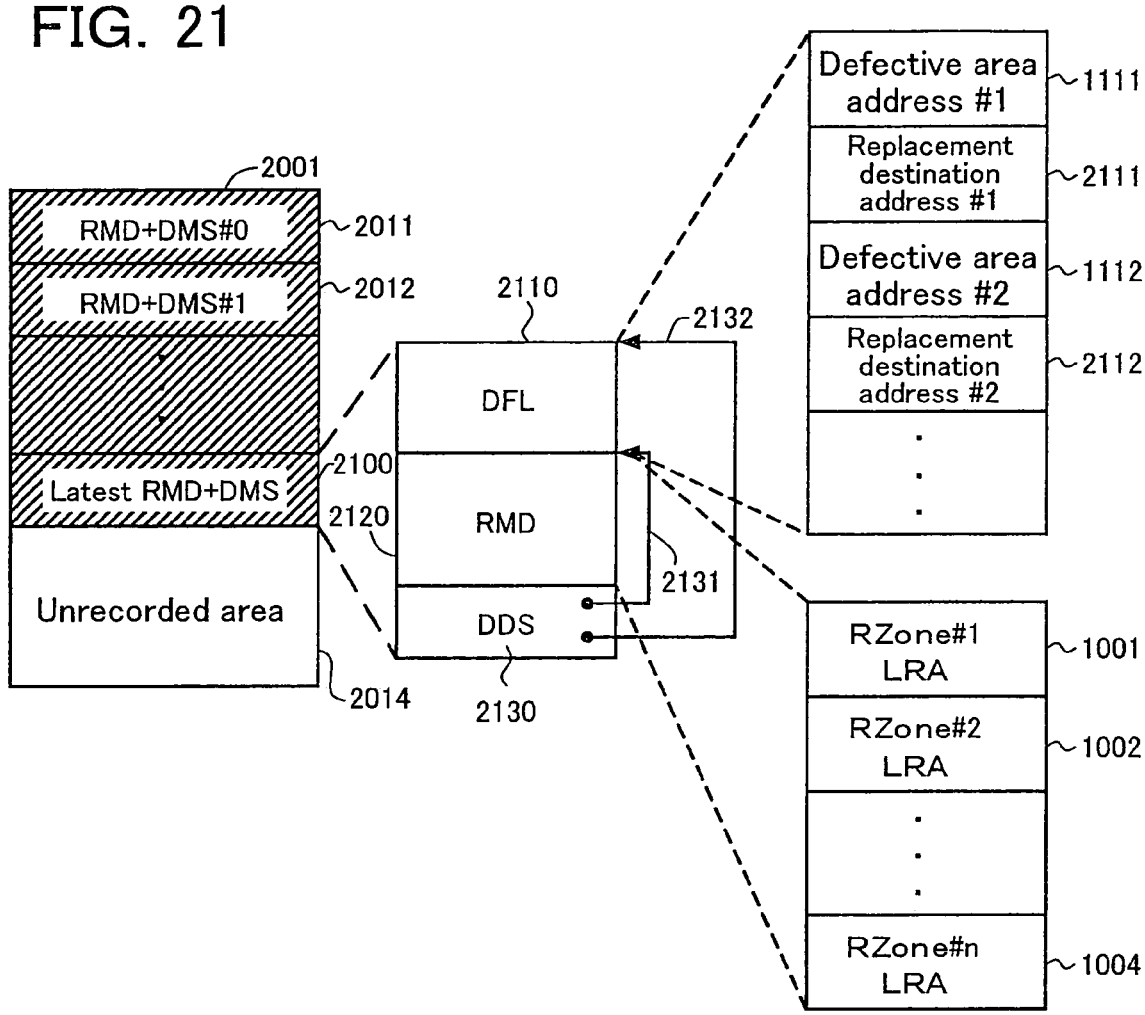
FIG. 21 is a diagram showing data structures of an RMA+DMA and an RMD+DMS of a write-once information recording medium according to the present invention.

FIG. 21 is a diagram showing a data structure of the RMA+DMA 2001. The RMA+DMA 2001 stores a plurality of RMD+DMS's 2011, 2012, and 2100, which are information of a combination of an RMD and a DMS. In the RMA+DMA 2001, RMD+DMS is recorded from the beginning thereof. Therefore, the latest RMD+DMS 2100 is recorded immediately before an unrecorded area 2014. The latest RMD+DMS 2100 contains a DDS 2130, a DFL 2110, and an RMD 2120. The DDS 2130 contains pointers 2131 and 2132 indicating the starting positions of the RMD 2120 and the DFL 2110, respectively. The DFL 2110 contains defective area addresses 1111 and 1112 of detected defective areas, and replacement destination addresses 2111 and 2112 indicating addresses of positions in a spare area, in which data is recorded in place of defective areas. The RMD 2120 contains LRA's 1001, 1002, and 1004.

Figure 22:
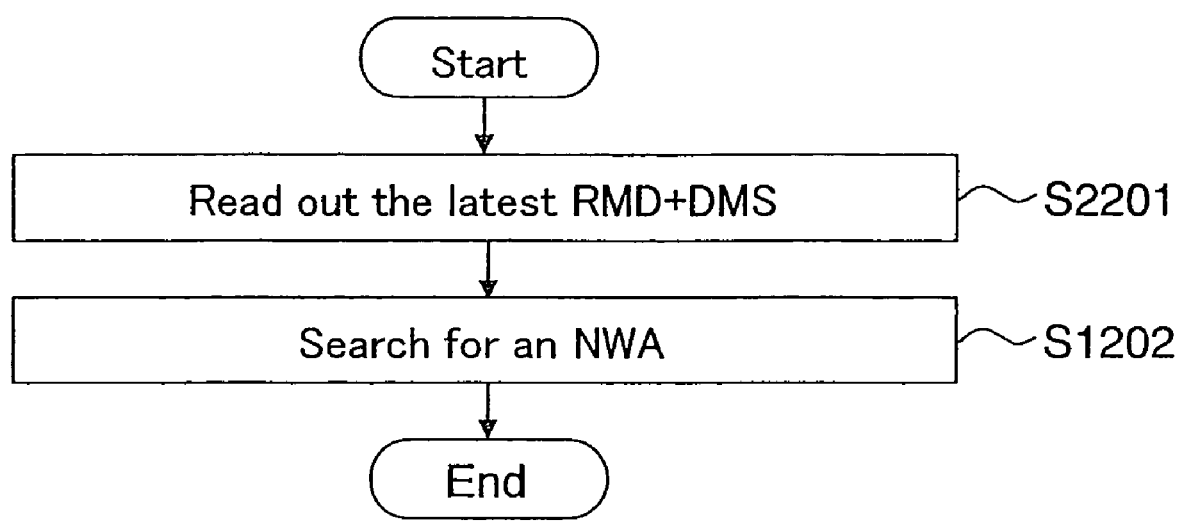
FIG. 22 is a flowchart showing an exemplary procedure performed by a recording/reproduction apparatus of the present invention from when a write-once information recording medium is loaded thereinto until the start of a recording operation.

FIG. 22 is a flowchart showing an exemplary procedure performed by the recording/reproduction apparatus 2500 from when the write-once information recording medium 2000 is loaded thereinto until the start of a recording operation.

In step 2201, the latest RMD+DMS is read out from the RMA+DMA 2001.

In step 1202, an NWA is searched for in a writable RZone with reference to the RMD+DMS read out in step 2201. The NWA is determined by, for example, the procedure shown in FIG. 14 of Embodiment 1 or FIG. 16 of Embodiment 2.

Figure 23:
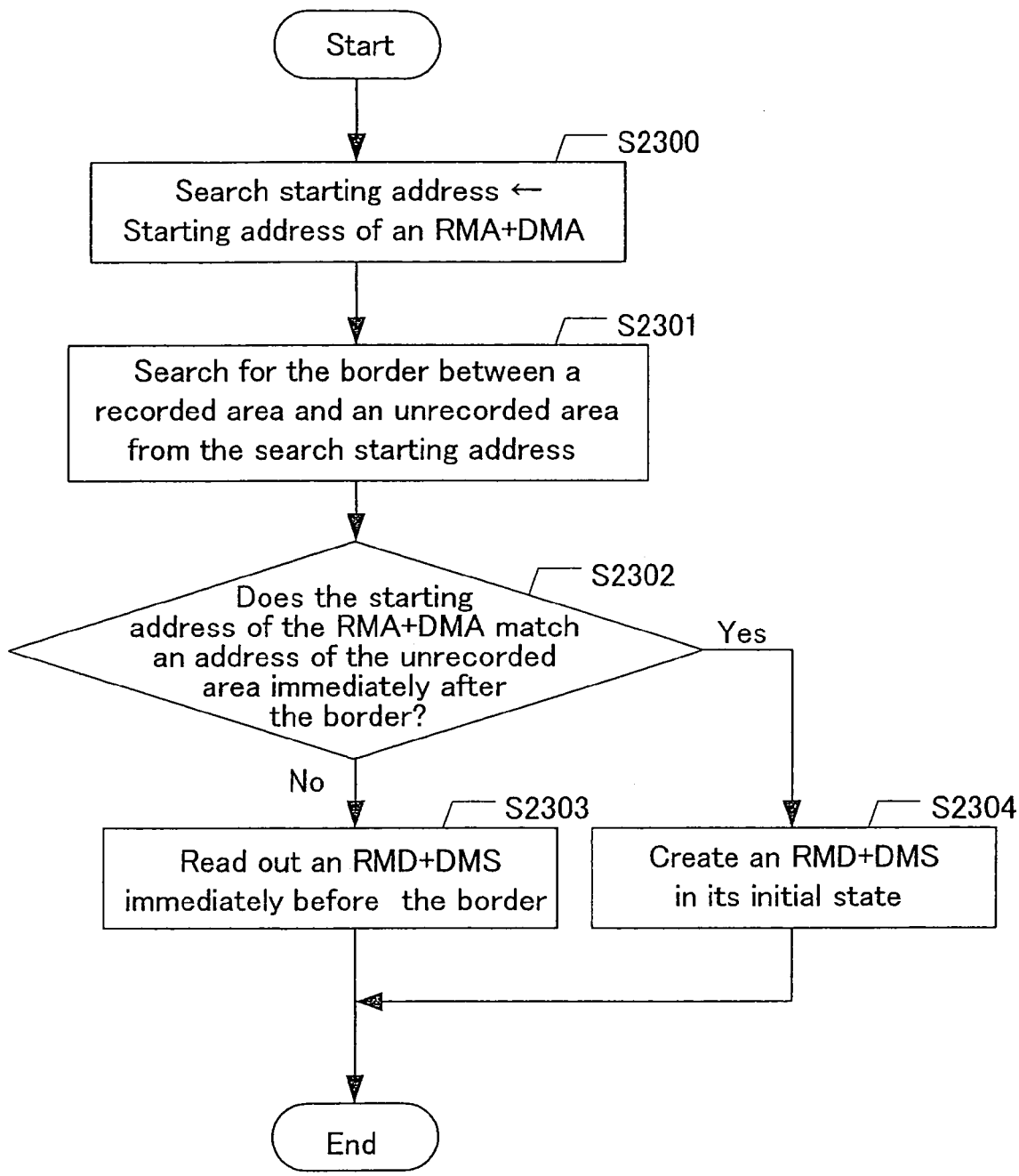
FIG. 23 is a flowchart showing an exemplary procedure for reading the latest RMD+DMS according to the present invention.

FIG. 23 is a flowchart showing an exemplary procedure of step 2201 in FIG. 22.

In step 2300, the CPU 2505 designates the starting address of the RMA+DMA 2001 as a search starting address, from which a search for the border between a recorded area and an unrecorded area is started.

In step 2301, the searching portion 2504 starts searching for the border between a recorded area and an unrecorded area from the search starting address.

In step 2302, the CPU 2505 determines whether or not the address of an unrecorded area immediately after the detected border matches the starting address of the RMA+DMA 2001. When the two addresses do not match each other, it is determined that the RMD+DMS has been recorded, and the process goes to step 2303. When the two addresses match each other, it is determined that the RMD+DMS has not been recorded, and the process goes to step 2304.

An RMD+DMS recorded in an area immediately before the unrecorded area is the latest RMD+DMS 2100. Instep 2303, the recording/reproduction control portion 2503 reads out the RMD+DMS 2100 recorded in the area immediately before the detected border, and the CPU 2505 stores the latest DFL 2110 and the latest RMD 2120 into the buffer 2506.

In step 2304 (no RMD+DMS has been recorded), for example, the CPU 2505 determines that the write-once information recording medium 2000 is a brand-new disc, generates a flag indicating the brand-new state and a DMS in an initial state indicating that a defective area address is 0, and stores the flag and the DMS into the buffer 2506.

Figure 24:
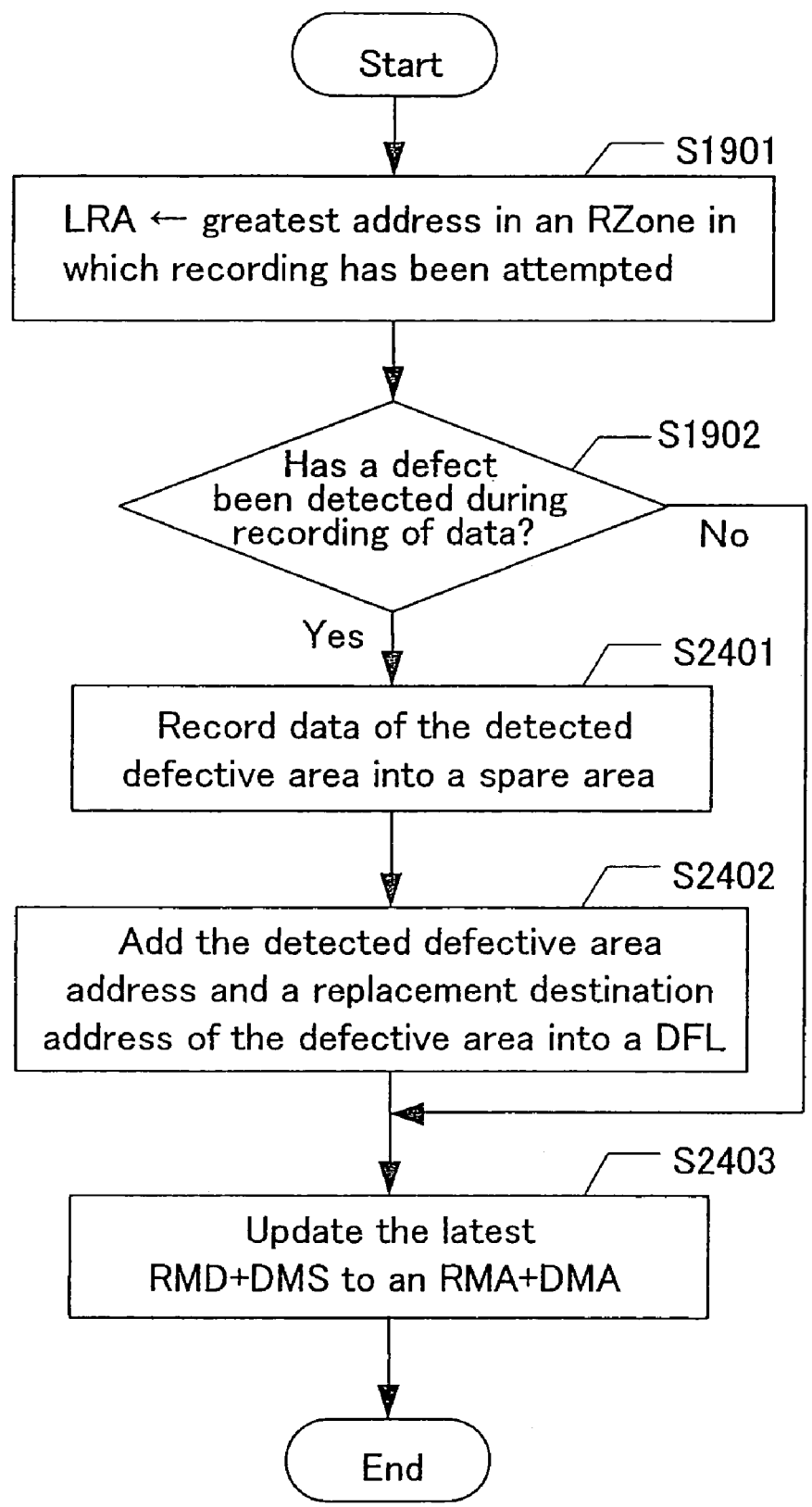
FIG. 24 is a flowchart showing an exemplary procedure for updating an RMA+DMA according to the present invention.

FIG. 24 is a flowchart showing an exemplary method for recording an updated RMD+DMS into an RMA+DMA.

In step 1901, the CPU 2505 sets the greatest address in an RZone, in which recording has been attempted, to be an LRA.

In step 1902, the recording/reproduction control portion 2503 determines whether or not a defect has been found during recording of user data. When no defect has been found, the process goes to step 2403.

When a defect has been found in step 1902, the CPU 2505 instructs the recording/reproduction control portion 2503 to perform a replacement procedure, in which data which was otherwise to be recorded in the detected defective area, is recorded into a spare area (replacement destination). The recording/reproduction control portion 2503 performs the replacement procedure (step 2401).

In step 2402, the CPU 2505 sets the address of the detected defective area as a defective area address, sets the address of the spare area storing the data in that area as a replacement destination address, and adds these addresses into the DFL 2110, i.e., updates the DFL 2110.

In step 2403, the recording/reproduction control portion 2503 records the latest RMD+DMS containing the updated DFL and the updated LRA into the RMA+DMA 2001.

In the procedure of FIG. 24, steps 1905 and 1906 of FIG. 19 may be performed. In this case, in a recorded area after an LRA, an LRA in which there is no detected defective area is contained in the latest RMD of an RMA+DMA.

There is no detected defective area in a recorded area after an LRA contained in the latest RMD. Therefore, only a one-time procedure for searching the border between a recorded area and an unrecorded area is required. Therefore, the time required for detecting an NWA can be reduced. With this updating method, a write-once information recording medium is realized such that there is no detected defective area in a recorded area after an LRA contained in the latest RMD.

In Embodiment 4, a DFL and an RMD are recorded together into an RMA+DMA. Therefore, an area can be efficiently used as compared with when a DFL and an RMD are separated. In addition, only a one-time procedure for searching the border between a recorded area and an unrecorded area is required when reading the latest DMS and the latest RMD, thereby making it possible to reduce a procedure time.

In Embodiment 4, after a defect is detected, data in the defective area is recorded into a spare area, and a replacement destination address is added to a DFL. Clearly, only by simply updating an LRA after a defect is detected, an LRA which has no detected defective area is contained in the latest RMD in a recorded area after the LRA.

As described in Embodiments 1 to 4, the recording/reproduction apparatus 2500 performs a method for searching for a writable area and a method for updating recording management information.

Note that the recording/reproduction control portion 2503, the searching portion 2504, the CPU 2505, the buffer 2506, and the internal bus 2507 are typically realized in an LSI which is an integrated circuit. These components may be separately provided in respective one-chips. Alternatively, a part or all of these components may be integrated into one-chip.

As used herein, an integrated circuit is called LSI. The integrated circuit may be called IC, system LSI, super LSI, or ultra LSI, depending on the scale of integrity.

The integrated circuit of the present invention is not limited to LSI, and may be realized with a specialized circuit or a general processor. A FPGA (Field Programmable Gate Array) which can be programmed after LSI manufacture, or a reconfigurable processor in which connections or settings of circuit cells can be reconfigured, may be used.

In addition, if integrated circuit technology appears due to a progress in semiconductor technology or another derivative technology and replaces current LSI technology, such new technology may be used for integration of functional blocks. Adaptation in biotechnology may be used.

The above-described embodiments of the present invention are provided for illustrative purposes only. Any data structure and algorithm may be used as long as they do not depart from the essence of the present invention.

For example, a DFL or an RMD may have a fixed length or a variable length.

For example, a DDS may not be recorded at the terminating end of a recorded area.

For example, an RMD may be recorded earlier than a DFL, or vice versa.

For example, the latest RMD may be found later than the latest DMS.

For example, a plurality of RMA's and DMA's having the same contents may be recorded for multiplexing.

For example, a plurality of RMA's and DMA's may be provided and used in rotation.

For example, when a defect is detected, data in a defective area may or may not be recorded into a spare area.

For example, replacement to a spare area may be performed earlier than in addition to a DFL, or vice versa.

For example, when replacement to a spare area is not performed, there may be no spare area.

For example, when the starting position of an RMD or a DFL is recorded at a prescribed position from a recording end position, a pointer indicating the starting position may not be recorded.

For example, a defective area address or a replacement destination address contained in a DFL, and an LRA or range information contained in an RMD, may be arranged in a prescribed data format, and are not limited to the data formats shown in FIGS. 15 and 21.

Figure 6:
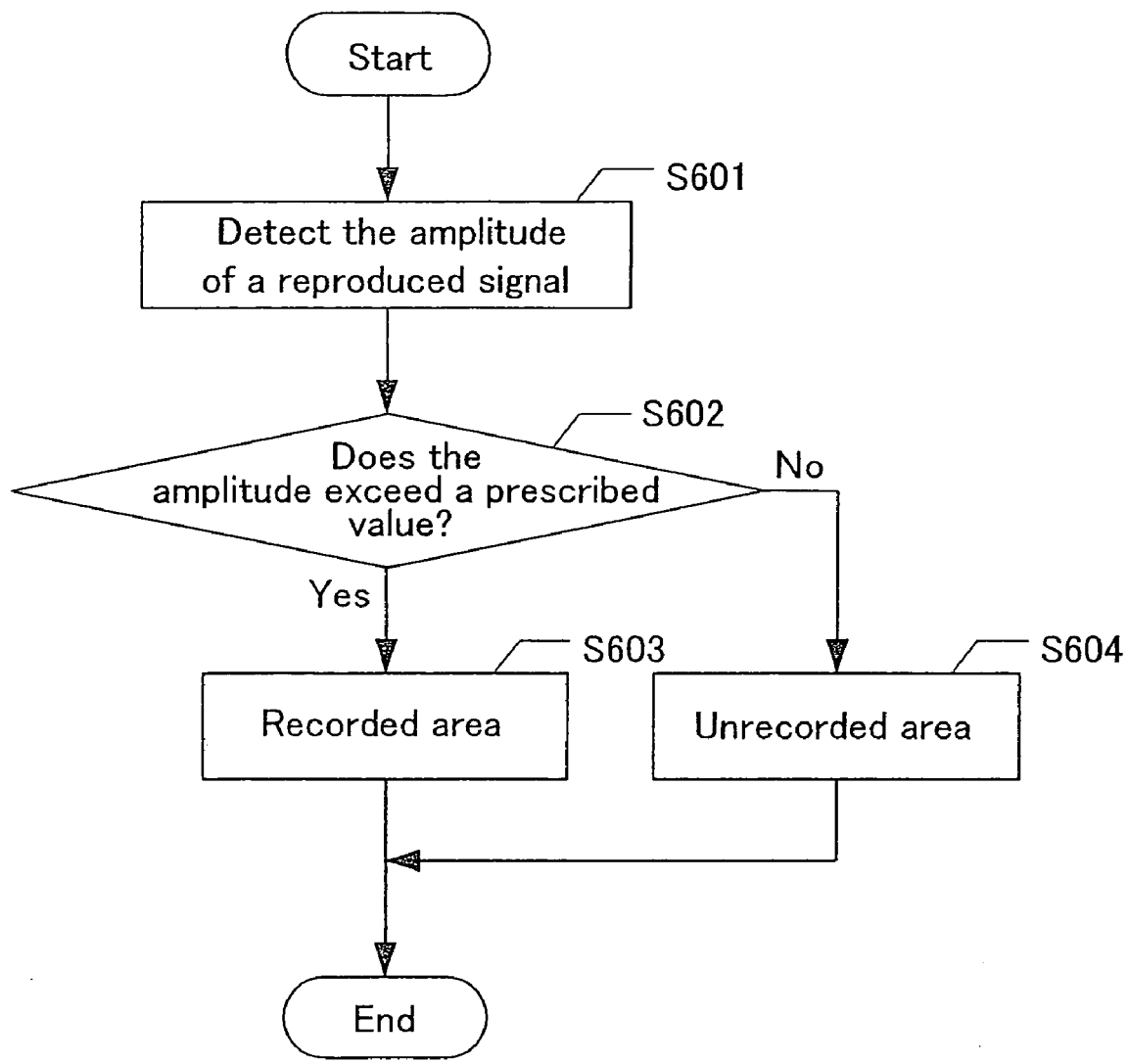
FIG. 6 is a flowchart showing an exemplary method for distinguishing a recorded area from an unrecorded area.
Figure 7:
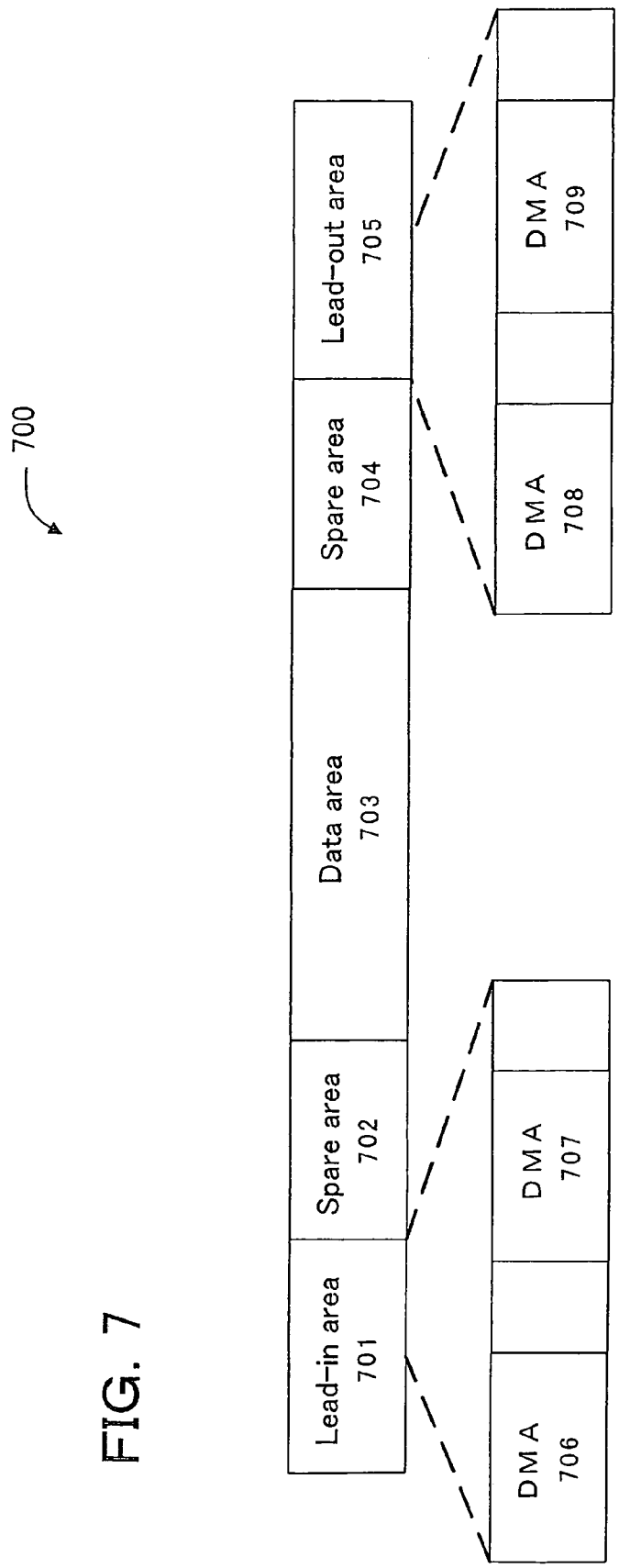
FIG. 7 is a diagram showing a data structure of a DVD-RAM disc (4.7 GBytes).
Figure 8:
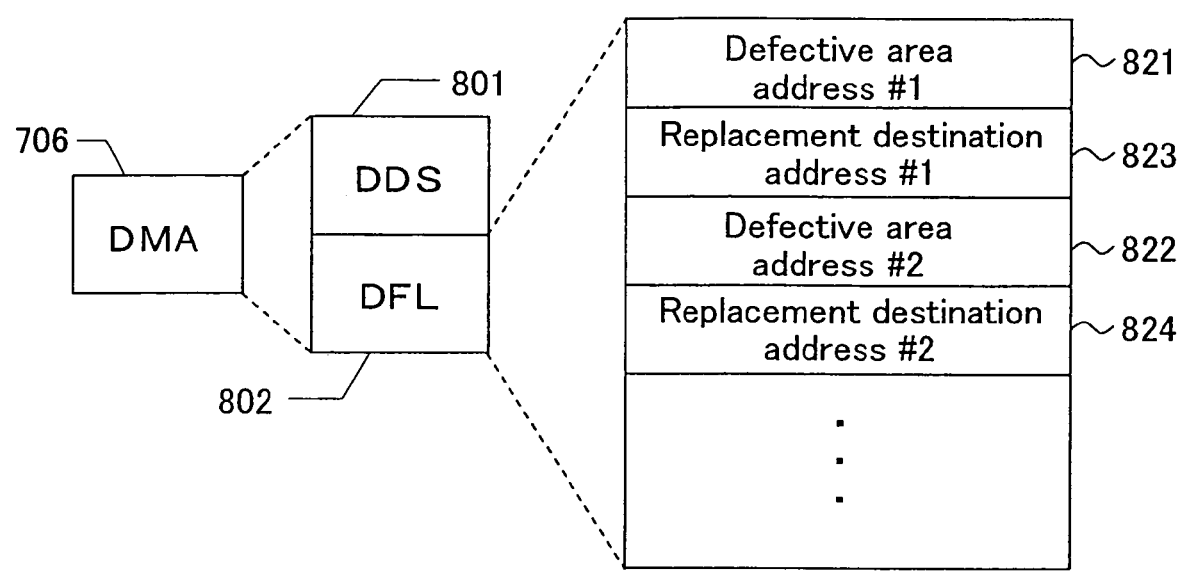
FIG. 8 is a diagram showing data structures of a DMA and a DMS of a DVD-RAM disc (4.7 GBytes).

A method for distinguishing a recorded area from an unrecorded area may not be limited to the distinguishing method of FIG. 6. For example, reproduced data is subjected to error correction, and it may be determined whether or not an error exceeds a correction limit. For example, it may be determined whether or not address information contained in data can be normally obtained. For example, a jitter value indicating the quality of a reproduced signal, MLSE (Maximum Likelihood Sequence Error), or the like may be used.

According to the present invention, it is determined whether or not a detected unrecorded area matches a defective area, thereby preventing a defective area from being determined to be a writable area. Therefore, information can be consistently recorded into a normal recording area.

According to the present invention, a write-once information recording medium is realized such that there is no detected defective area in a recorded area after a last recorded address in a prescribed recording range. According to the present invention, the latest last recorded address is consistently an address indicating a recorded area on or after a defective area. Thereby, only a one-time procedure for searching the border between a recorded area and an unrecorded area is required, resulting in a reduction in the time spent determining a writable area.

According to the present invention, a pointer indicating a starting position of information indicating a defect list or a recorded state is contained in a write-once information recording medium. Therefore, an RMD or a DMS can have a variable length. Therefore, an area can be more efficiently used.

According to the present invention, an RMD and a DMS are recorded together. Therefore, only a one-time procedure for searching the border between a recorded area and an unrecorded area is required when the latest RMD and DMS are read out, resulting in a reduction in the procedure time.

Thus, the present invention is useful in the technical field of recording information onto a write-once information recording medium and reproducing information from a write-once information recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for searching for a writable area of a write-once information recording medium, wherein
the write-once information recording medium comprises:
a data area for recording user data;
a recording management area for recording recording management information indicating a recorded state of the data area; and
a defect management area for recording defect management information for managing at least one defective area when the at least one defective area has been detected in the data area,
the recording management information contains at least one recorded area address indicating at least one recorded area,
the defect management information contains at least one defective area address indicating the at least one defective area when the at least one defective area has been detected,
the apparatus comprises:
a head portion for performing at least one of recording information onto the write-once information recording medium and reproducing information from the write-once information recording medium;
a searching portion for searching for an unrecorded area of the write-once information recording medium; and
a control portion for controlling operations of the head portion and the searching portion,
when there is at least one defective area in a prescribed recording range of the data area, the control portion detects a defective area address indicating an address of a defective area located at a last address in the at least one defective area of the prescribed recording range,
the control portion sets an address, located after both the detected defective area address and a recorded area address indicating a recorded area of the prescribed recording range, to be a candidate address indicating a candidate for the writable area, and
the searching portion searches for an unrecorded area using the candidate address as a reference, and the control portion determines the detected unrecorded area as the writable area.

2. An integrated circuit for searching for a writable area of a write-once information recording medium, wherein
the write-once information recording medium comprises:
a data area for recording user data;
a recording management area for recording recording management information indicating a recorded state of the data area; and
a defect management area for recording defect management information for managing at least one defective area when the at least one defective area has been detected in the data area,
the recording management information contains at least one recorded area address indicating at least one recorded area,
the defect management information contains at least one defective area address indicating the at least one defective area when the at least one defective area has been detected,
the integrated circuit comprises:
a searching portion for searching for an unrecorded area of the write-once information recording medium; and
a control portion for controlling an operations of the searching portion,
when there is at least one defective area in a prescribed recording range of the data area, the control portion detects a defective area address indicating an address of a defective area located at a last address in the at least one defective area of the prescribed recording range,
the control portion sets an address, located after both the detected defective area address and a recorded area address indicating a recorded area of the prescribed recording range, to be a candidate address indicating a candidate for the writable area, and
the searching portion searches for an unrecorded area using the candidate address as a reference, and the control portion determines the detected unrecorded area as the writable area.

3. A method for searching for a writable area of a write-once information recording medium, wherein
the write-once information recording medium comprises:
a data area for recording user data;
a recording management area for recording recording management information indicating a recorded state of the data area; and
a defect management area for recording defect management information for managing at least one defective area when the at least one defective area has been detected in the data area,
the recording management information contains at least one recorded area address indicating at least one recorded area,
the defect management information contains at least one defective area address indicating the at least one defective area when the at least one defective area has been detected, the method comprises the steps of:
  when there is at least one defective area in a prescribed recording range of the data area, detecting a defective area address indicating an address of a defective area located at a last address in the at least one defective area of the prescribed recording range;
  setting an address, located after both the detected defective area address and a recorded area address indicating a recorded area of the prescribed recording range, to be a candidate address indicating a candidate for the writable area; and
  searching for an unrecorded area using the candidate address as a reference, and determining the detected unrecorded area as the writable area.

* * * * *